US012684171B2

(12) United States Patent
Wang

(10) Patent No.: US 12,684,171 B2
(45) Date of Patent: Jul. 14, 2026

(54) DECODING METHOD, ENCODING METHOD, DECODER, AND ENCODER

(71) Applicant: GUANGDONG OPPO MOBILE TELECOMMUNICATIONS CORP., LTD., Dongguan (CN)

(72) Inventor: Fan Wang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 18/911,783

(22) Filed: Oct. 10, 2024

(65) Prior Publication Data

US 2025/0039452 A1 Jan. 30, 2025

Related U.S. Application Data

(63) Continuation of application No. PCT/CN2022/086446, filed on Apr. 12, 2022.

(51) Int. Cl.
H04N 19/61 (2014.01)
H04N 19/176 (2014.01)
(Continued)

(52) U.S. Cl.
CPC ........... H04N 19/61 (2014.11); H04N 19/176 (2014.11); H04N 19/18 (2014.11); H04N 19/46 (2014.11)

(58) Field of Classification Search
CPC ...... H04N 19/61; H04N 19/176; H04N 19/18; H04N 19/46; H04N 19/70; H04N 19/119; H04N 19/12
See application file for complete search history.

(56) References Cited

U.S. PATENT DOCUMENTS

2011/0200097 A1* 8/2011 Chen .................... H04N 19/513
375/E7.243
2017/0150183 A1* 5/2017 Zhang .................. H04N 19/597
(Continued)

FOREIGN PATENT DOCUMENTS

CN 101415121 4/2009
CN 112400317 2/2021
(Continued)

OTHER PUBLICATIONS

WIPO, International Search Report and Written Opinion for International Application No. PCT/CN2022/086446, Nov. 21, 2022.
(Continued)

*Primary Examiner* — Jared Walker
(74) *Attorney, Agent, or Firm* — Hodgson Russ LLP

(57) ABSTRACT

A decoding method, an encoding method, a decoder, and an encoder are provided. The decoding method includes the following. A bitstream is decoded to obtain a first transform coefficient of a current block. A first transform is performed on the first transform coefficient of the current block to obtain a second transform coefficient of the current block. A second transform is performed on the second transform coefficient to obtain a residual block of the current block. The current block is predicted based on a first prediction mode and a second prediction mode which correspond to a geometric partitioning mode (GPM) to obtain a prediction block of the current block. A reconstructed block of the current block is obtained based on the prediction block of the current block and the residual block of the current block.

12 Claims, 16 Drawing Sheets

(51) Int. Cl.
     *H04N 19/18*     (2014.01)
     *H04N 19/46*     (2014.01)

(56)     References Cited

U.S. PATENT DOCUMENTS

| | | | | |
|---|---|---|---|---|
| 2021/0092392 A1* | 3/2021 | Reuze | .................. | H04N 19/132 |
| 2021/0360271 A1* | 11/2021 | Furht | .................. | H04N 19/119 |
| 2021/0368208 A1 | 11/2021 | Samuelsson et al. | | |
| 2022/0182662 A1* | 6/2022 | Kang | .................. | H04N 19/503 |
| 2022/0321890 A1* | 10/2022 | Lim | ..................... | H04N 19/137 |
| 2023/0007290 A1* | 1/2023 | Lim | ..................... | H04N 19/186 |
| 2023/0073705 A1* | 3/2023 | Wang | .................. | H04N 19/184 |
| 2023/0164315 A1* | 5/2023 | Lee | ........................ | H04N 19/70 |
| | | | | 375/240.02 |
| 2024/0430423 A1* | 12/2024 | Lim | ..................... | H04N 19/134 |
| 2025/0203113 A1* | 6/2025 | Choi | ...................... | H04N 19/60 |

FOREIGN PATENT DOCUMENTS

| | | | | | |
|---|---|---|---|---|---|
| CN | 112400317 A | * | 2/2021 | ............. | H04N 19/82 |
| CN | 114097223 | | 2/2022 | | |
| JP | 2025010550 | | 1/2025 | | |
| JP | 2025014088 | | 1/2025 | | |
| KR | 20190088338 | | 7/2019 | | |
| WO | 2020009086 | | 1/2020 | | |
| WO | 2021015581 | | 1/2021 | | |

OTHER PUBLICATIONS

WIPO, International Search Report and Written Opinion for International Application No. PCT/CN2022/086447, Nov. 21, 2022.

USPTO, Non-Final Office Action for U.S. Appl. No. 18/911,919, Nov. 17, 2025.

JPO, Office Action for JP Application No. 2024-560349, Dec. 12, 2025.

JPO, Office Action for JP Application No. 2024-560516, Dec. 12, 2025.

EPO, Extended European Search Report for EP Application No. 22936833.7, Jan. 21, 2026.

EPO, Extended European Search Report for EP Application No. 22936834.5, Jan. 16, 2026.

* cited by examiner

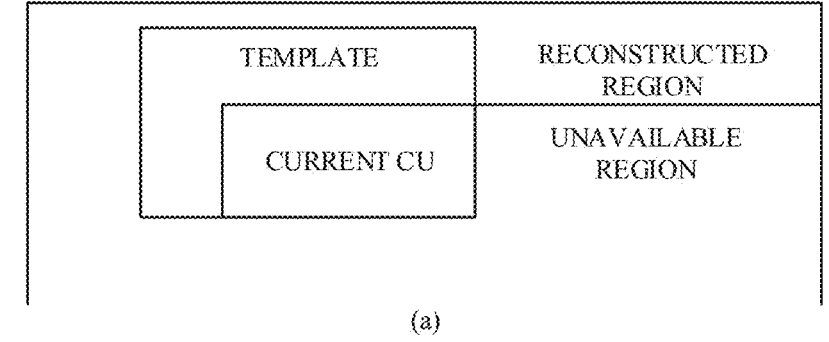
(a)
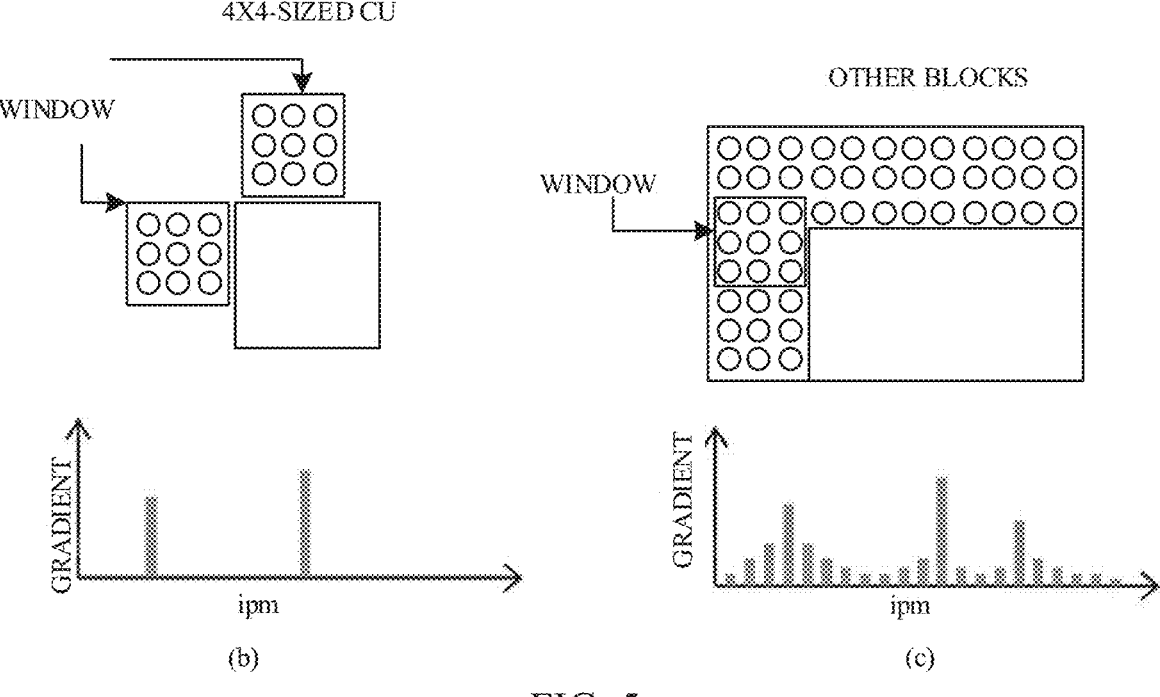
(b)                                    (c)
FIG. 5

PARTITION LINE

16 INPUT COEFFICIENTS FOR 4X4 LFNST; OR
64 INPUT COEFFICIENTS FOR 8X8 LFNST

8 INPUT COEFFICIENTS FOR 4X4 INVERSE LFNST; OR
16 INPUT COEFFICIENTS FOR 8X8 INVERSE LFNST (a)        (b)        (c)        (d)

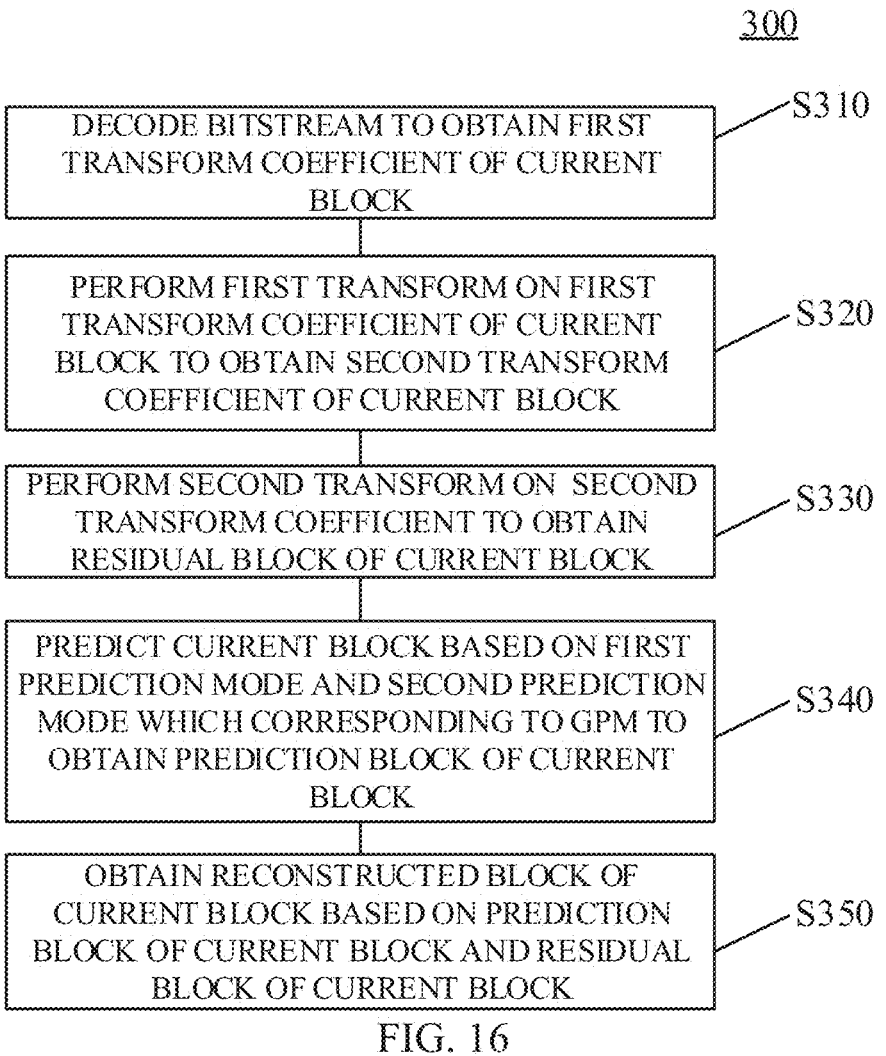

300

DECODE BITSTREAM TO OBTAIN FIRST TRANSFORM COEFFICIENT OF CURRENT BLOCK — S310

PERFORM FIRST TRANSFORM ON FIRST TRANSFORM COEFFICIENT OF CURRENT BLOCK TO OBTAIN SECOND TRANSFORM COEFFICIENT OF CURRENT BLOCK — S320

PERFORM SECOND TRANSFORM ON SECOND TRANSFORM COEFFICIENT TO OBTAIN RESIDUAL BLOCK OF CURRENT BLOCK — S330

PREDICT CURRENT BLOCK BASED ON FIRST PREDICTION MODE AND SECOND PREDICTION MODE WHICH CORRESPONDING TO GPM TO OBTAIN PREDICTION BLOCK OF CURRENT BLOCK — S340

OBTAIN RECONSTRUCTED BLOCK OF CURRENT BLOCK BASED ON PREDICTION BLOCK OF CURRENT BLOCK AND RESIDUAL BLOCK OF CURRENT BLOCK — S350

FIG. 16

DECODING METHOD, ENCODING METHOD, DECODER, AND ENCODER

CROSS REFERENCE TO RELATED APPLICATION(S)

This application is a continuation of International Application No. PCT/CN2022/086446, filed Apr. 12, 2022, the entire disclosure of which is incorporated herein by reference.

TECHNICAL FIELD

This disclosure relates to the field of video coding, and in particular to a decoding method, an encoding method, a decoder, and an encoder.

BACKGROUND

Digital video compression technology mainly involves compressing a huge amount of digital picture video data, so as to facilitate transmission, storage, or the like. With the surge of internet video and higher requirements for video clarity, although a video decompression technology can be realized with existing digital video compression standards, at present, there is still a need for better digital video compression technology to improve compression efficiency.

SUMMARY

In a first aspect, a decoding method is provided in the present disclosure. The decoding method includes the following. A bitstream is decoded to obtain a first transform coefficient of a current block. A first transform is performed on the first transform coefficient of the current block to obtain a second transform coefficient of the current block. A second transform is performed on the second transform coefficient to obtain a residual block of the current block. The current block is predicted based on a first prediction mode and a second prediction mode which correspond to a geometric partitioning mode (GPM) to obtain a prediction block of the current block. A reconstructed block of the current block is obtained based on the prediction block of the current block and the residual block of the current block.

In a second aspect, an encoding method is provided in the present disclosure. The encoding method includes the following. A current block is predicted based on a first prediction mode and a second prediction mode which correspond to a GPM to obtain a prediction block of the current block. A residual block of the current block is obtained based on the prediction block of the current block. A third transform is performed on the residual block of the current block to obtain a third transform coefficient of the current block. A fourth transform is performed on the third transform coefficient to obtain a fourth transform coefficient of the current block. The fourth transform coefficient is encoded.

In a third aspect, a decoder is provided in the present disclosure. The decoder includes a processor configured to execute a computer program, and a non-transitory computer-readable storage medium configured to store the computer program which, when executed by the processor, causes the processor to: decode a bitstream to obtain a first transform coefficient of a current block, perform a first transform on the first transform coefficient to obtain a second transform coefficient of the current block, perform a second transform on the second transform coefficient to obtain a residual block of the current block, predict the current block based on a first prediction mode and a second prediction mode which correspond to a GPM to obtain a prediction block of the current block, and obtain a reconstructed block of the current block based on the prediction block of the current block and the residual block of the current block.

In a fourth aspect, an encoder is provided in the present disclosure. The encoder includes a processor configured to execute a computer program, and a non-transitory computer-readable storage medium configured to store the computer program which, when executed by the processor, causes the processor to: predict a current block based on a first prediction mode and a second prediction mode which correspond to a GPM to obtain a prediction block of the current block, obtain a residual block of the current block based on the prediction block of the current block, perform a third transform on the residual block of the current block to obtain a third transform coefficient of the current block, perform a fourth transform on the third transform coefficient to obtain a fourth transform coefficient of the current block, and encode the fourth transform coefficient.

BRIEF DESCRIPTION OF THE DRAWINGS

FIG. 5 is a schematic diagram illustrating derivation of a prediction mode via decoder-side intra-mode derivation (DIMD) provided in embodiments of the present disclosure.

FIG. 16 is a schematic flowchart of a decoding method provided in embodiments of the present disclosure.

DETAILED DESCRIPTION

Figure 1:
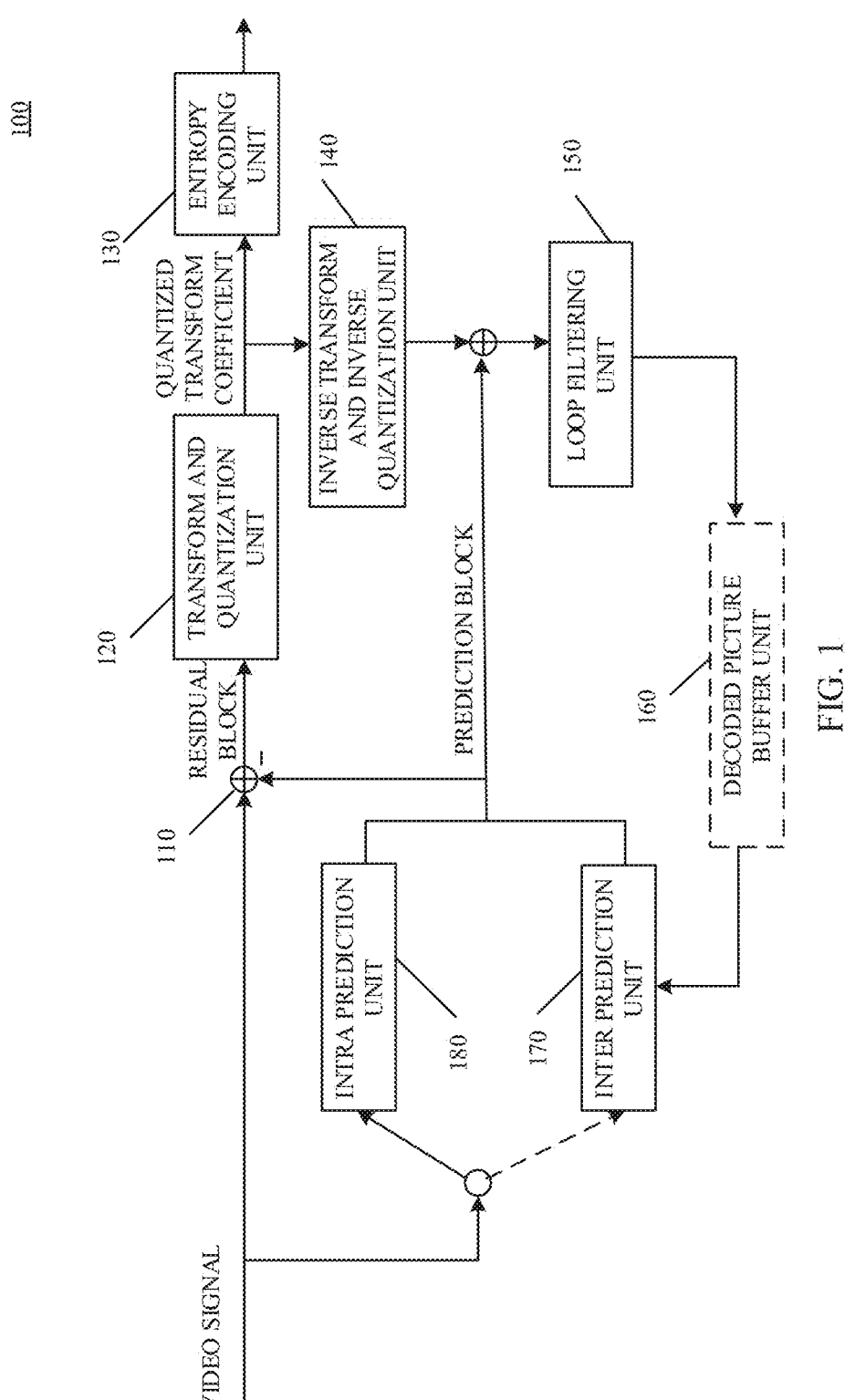
FIG. 1 is a schematic block diagram of an encoding framework provided in embodiments of the present disclosure.

The following will describe technical solutions of embodiments of the present disclosure with reference to accompanying drawings.

Solutions of embodiments of the present disclosure are applicable to the technical field of digital video coding, including but not limited to picture coding, video coding, hardware video coding, dedicated circuit video coding, real-time video coding, etc. In addition, the solutions of embodiments of the present disclosure can be incorporated into audio video coding standards (AVS), AVS 2, or AVS 3. For example, the AVS includes, but is not limited to, H.264/audio video coding (AVC) standard, H.265/high efficiency video coding (HEVC) standard, and H.266/versatile video coding (VVC) standard. Furthermore, the solutions of embodiments of the present disclosure can be used for performing lossy compression or lossless compression on a picture. The lossless compression can be visually lossless compression or mathematically lossless compression.

A block-based hybrid coding framework is generally used in video coding standards. Each picture of a video is partitioned into largest coding units (LCUs) or coding tree units (CTUs), which are squares of equal size (e.g., 128× 128, 64×64, etc.). Each LCU or CTU can be partitioned into rectangular coding units (CUs) according to certain rules. Furthermore, the CU can also be partitioned into prediction units (PUs), transform units (TUs), etc. The hybrid coding framework can include modules such as prediction, transform, quantization, entropy coding, and loop filter. The prediction module includes intra prediction and inter prediction, and the inter prediction includes motion estimation and motion compensation. Since there is a strong correlation among neighbouring samples in a video picture, using intra prediction in video coding can eliminate spatial redundancy between neighbouring samples. The intra prediction only refers to picture information of a same picture to predict sample information of a current partitioned block. Moreover, since there is also a strong similarity between neighbouring pictures in the video, using inter prediction in video coding can eliminate temporal redundancy between neighbouring pictures, thereby improving coding efficiency. The inter prediction can refer to picture information of different pictures and use motion estimation to search motion vector information that best matches the current partitioned block. For the transform, a predicted block is transformed into a frequency domain, redistributing energy. Combined with the quantization, information that is not sensitive to human eyes is removed, thereby eliminating visual redundancy. The entropy coding can eliminate character redundancy according to a current context model and probability information of a binary bitstream.

In a digital video encoding process, an encoder reads a black-and-white picture or a colour picture from an original picture sequence, and then encodes the black-and-white picture or the colour picture. The black-and-white picture can include samples of luma components, and the colour picture can include samples of chroma components. Optionally, the colour picture can also include samples of luma components. A colour format of the original picture sequence can be a luma-chroma (YCbCr, YUV) format or a red-green-blue (RGB) format, etc. Specifically, after the encoder reads the black-and-white picture or the colour picture, the encoder partitions the black-and-white picture or the colour picture into blocks respectively. A prediction block of a current block is generated by performing intra prediction or inter prediction on the current block. A residual block is obtained by subtracting the prediction block from an original block of the current block. A quantization coefficient matrix is obtained by performing transform and quantization on the residual block. The quantization coefficient matrix is encoded into a bitstream by entropy encoding. In a digital video decoding process, at a decoding end, the prediction block of the current block is generated by performing intra prediction or inter prediction on the current block. More-over, the quantization coefficient matrix is obtained by decoding the bitstream, the residual block is obtained by performing inverse quantization and inverse transformation on the quantization coefficient matrix, and the reconstructed block is obtained by adding the prediction block and the residual block. The reconstructed blocks can form a recon-structed picture. A decoded picture is obtained by perform-ing loop filtering on the reconstructed picture on a picture basis or on a block basis.

The current block can also be a current CU or a current PU.

It can be noted that similar operations for obtaining the decoded picture are also needed at an encoding end. The decoded picture can be a reference picture of a subsequent picture for inter prediction. Block partition information determined at the encoding end, as well as mode information or parameter information for prediction, transformation, quantization, entropy coding, loop filtering, etc., are carried in the bitstream when necessary. The decoding end parses the bitstream and analyzes existing information to determine the block partition information, as well as the mode infor-mation or the parameter information for prediction, trans-formation, quantization, entropy coding, loop filtering, etc. the same as such information at the encoding end, so as to ensure that the decoded picture obtained by the encoding end is the same as the decoded picture obtained by the decoding end. The decoded picture obtained by the encoding end is also referred to as "reconstructed picture". The current block can be partitioned into PUs during prediction, the current block can be partitioned into transform units (TUs) during transform, and partition of PUs can be different from partition of TUs. Certainly, the above is a basic process of the video encoder and the video decoder under the block-based hybrid coding framework. With the development of technology, some modules or steps of the framework or process can be optimized. The present disclosure is appli-cable to the basic process of the video encoder and the video decoder under the block-based hybrid coding framework.

For ease of understanding, the following will give a brief introduction to an encoding framework provided in the present disclosure.

FIG. 1 is a schematic block diagram of an encoding framework 100 provided in embodiments of the present disclosure.

As illustrated in FIG. 1, the encoding framework 100 can include an intra prediction unit 180, an inter prediction unit 170, a residual unit 110, a transform and quantization unit 120, an entropy encoding unit 130, an inverse transform and inverse quantization unit 140, and a loop filtering unit 150. Optionally, the encoding framework 100 can also include a decoded picture buffer unit 160. The encoding framework 100 can also be referred to as "hybrid framework encoding mode".

The intra prediction unit 180 or the inter prediction unit 170 can predict a block to-be-encoded to output a prediction block. The residual unit 110 can calculate a residual block, i.e., a difference between the prediction block and the block to-be-encoded, based on the prediction block and the block to-be-encoded. The transform and quantization unit 120 is configured to perform transform and quantization operations on the residual block to remove information that is not sensitive to the human eye, thereby eliminating visual redundancy. Optionally, the residual block before being transformed and quantized by the transform and quantization unit 120 can be referred to as "temporal residual block", and a temporal residual block after being transformed and quantized by the transform and quantization unit 120 can be referred to as "frequency residual block" or "frequency-domain residual block". The entropy encoding unit 130 receives quantized transform coefficients output by the transform and quantization unit 120, and can output a bitstream based on the quantized transform coefficients. For example, the entropy encoding unit 130 can eliminate character redundancy according to a target context model and probability information of a binary bitstream. For example, the entropy encoding unit 130 is configured to implement context-based adaptive binary arithmetic coding (CABAC). The entropy encoding unit 130 is also referred to as "header information encoding unit". Optionally, in the present disclosure, the block to-be-encoded can also be referred to as "original block" or "target block". The prediction block can also be referred to as "predicted block" or "picture prediction block", and can also be referred to as "prediction signal" or "prediction information". The reconstructed block can also be referred to as "reconstructed picture block" or "picture reconstruction block", and can also be referred to as "reconstructed signal" or "reconstructed information". Furthermore, for an encoding end, the block to-be-encoded can also be referred to as "encoding block" or "encoding picture block", and for a decoding end, the block to-be-decoded can also be referred to as "decoding block" or "decoding picture block". The block to-be-encoded can be a CTU or a CU.

The encoding framework 100 calculates a residual between the prediction block and the block to-be-encoded to obtain the residual block, the residual block is transformed, quantized, etc., and then transmitted to the decoder. Correspondingly, after the decoder receives and parses the bitstream, the decoder performs inverse transformation and inverse quantization to obtain the residual block, and then superimposes the residual block on the prediction block obtained through prediction by the decoder to obtain the reconstructed block.

It can be noted that in the encoding framework 100, the inverse transform and inverse quantization unit 140, the loop filtering unit 150, and the decoded picture buffer unit 160 can be configured to form a decoder. In other words, the intra prediction unit 180 or the inter prediction unit 170 can predict the block to-be-encoded based on an existed reconstructed block, so that the encoding end uses a reference frame in the same way as the decoding end. In other words, the encoder can replicate a processing loop of the decoder and thus can generate the same prediction as the decoding end. Specifically, the quantized transform coefficients are inversely transformed and inversely quantized by the inverse transform and inverse quantization unit 140 to replicate an approximate residual block at the decoding end. The approximate residual block plus the prediction block can then be processed by the loop filtering unit 150 to smoothly filter out effects such as blocking due to block-based processing and quantization. The block output from the loop filtering unit 150 can be stored in the decoded picture buffer unit 160 for the prediction of subsequent pictures.

It can be understood that FIG. 1 is only an example of the present disclosure and cannot be construed as a limitation to the present disclosure.

For example, the loop filtering unit 150 in the encoding framework 100 can include a deblocking filter (DBF) and a sample adaptive offset (SAO). The DBF has a function of deblocking, and the SAO has a function of deringing. In other embodiments of the present disclosure, a neural network-based loop filtering algorithm can be used for the encoding framework 100 to improve video compression efficiency. Alternatively, the encoding framework 100 can be a video encoding hybrid framework based on a deep learning neural network. In an embodiment, a convolutional neural network (CNN)-based model can be used based on the DBF and the SAO to calculate a result after sample filtering. The loop filtering unit 150 can have the same or different network structure in a luma component and in a chroma component.

Considering that the luma component contains more visual information, the luma component can also be used for guiding the filtering of the chroma component, thereby improving the reconstruction quality of the chroma component.

The following will introduce contents related to intra prediction and inter prediction.

For inter prediction, the inter prediction can refer to picture information of different pictures and use motion estimation to search motion vector information that best matches the block to-be-encoded, so as to eliminate temporal redundancy. A picture for which inter prediction is used can be a P frame and/or a B frame, where the P frame refers to a forward predicted picture, and the B frame refers to bidirectional predicted picture.

For intra prediction, the intra prediction only refers to information of a same picture to predict sample information of the block to-be-encoded, thereby eliminating spatial redundancy. A frame used for intra prediction can be an I-frame. For example, according to an encoding order from the left to the right and from the top to the bottom, prediction can be performed on the block to-be-encoded by taking a top-left block, a top block, and a left block as reference information, and the block to-be-encoded is also used as reference information of a subsequent block. In this way, prediction can be performed on the whole picture. If an input digital video is in a colour format, such as a YUV 4:2:0 format, every 4 pixels of each picture in the digital video have 4 Y components and 2 UV components, and the encoding framework 100 can encode the Y components (i.e., luma block) and the UV components (i.e., chroma block) respectively. Similarly, the decoder can also decode correspondingly according to the format.

For an intra prediction process, in intra prediction, prediction can be performed on the block to-be-encoded in an angular prediction mode and in a non-angular prediction mode, to obtain a prediction block. An optimal prediction mode for the block to-be-encoded is selected according to rate-distortion information calculated from the prediction block and the block to-be-encoded. The prediction mode is then transmitted to the decoding end through the bitstream. The decoding end parses out the prediction mode and performs prediction to obtain a prediction block of a target decoding block. The prediction block is superimposed with a temporal residual block transmitted through the bitstream, so as to obtain a reconstructed block.

With the development of digital video coding standards over generations, the non-angular prediction mode remains relatively stable and includes a mean mode and a planar mode. The number of angular prediction modes increases continuously with the evolution of digital video coding standards. Taking international digital video coding standard H series as an example, H.264/AVC standard only includes eight angular prediction modes and one non-angular prediction mode, H.265/HEVC is extended to include 33 angular prediction modes and two non-angular prediction modes, and in H.266/VVC, the intra prediction mode is further extended. For luma blocks, there are in total 67 traditional prediction modes and a non-traditional prediction mode, i.e., a matrix weighted intra prediction (MIP) mode. These 67 traditional prediction modes include a planar mode, a DC mode, and 65 angular prediction modes, where the planar mode is usually used for processing some blocks with gradient textures, the DC mode is usually used for processing some flat areas, and the angular prediction mode is usually used for processing blocks with obvious angular textures.

It can be noted that, in the present disclosure, the current block for the intra prediction can be a square block or a rectangular block.

Further, since intra prediction blocks are all square, the probabilities of using respective angular prediction modes are equal. When the length and the width of the current block are not equal, for horizontal blocks (whose width is greater than its height), top reference samples are more likely to be used than left reference samples, and for vertical blocks (whose height is greater than its width), top reference samples are less likely to be used than left reference samples. Based on this, a wide angular prediction mode is introduced in the present disclosure. When a rectangular block is predicted, the traditional angular prediction mode is changed into the wide angular prediction mode. A prediction angle range of the current block when the wide angular prediction mode is used for predicting the rectangular block is larger than a prediction angle range when the traditional angular prediction mode is used for predicting the rectangular block. Optionally, when the wide angular prediction mode is used, an index of the traditional angular prediction mode can still be used for sending a signal. Correspondingly, the decoding end receives the signal and then can change the traditional angular prediction mode into the wide angular prediction mode. As such, the total number of intra prediction modes and an intra-mode encoding method remain unchanged, and the intra-mode encoding method remains unchanged.

Figure 2:
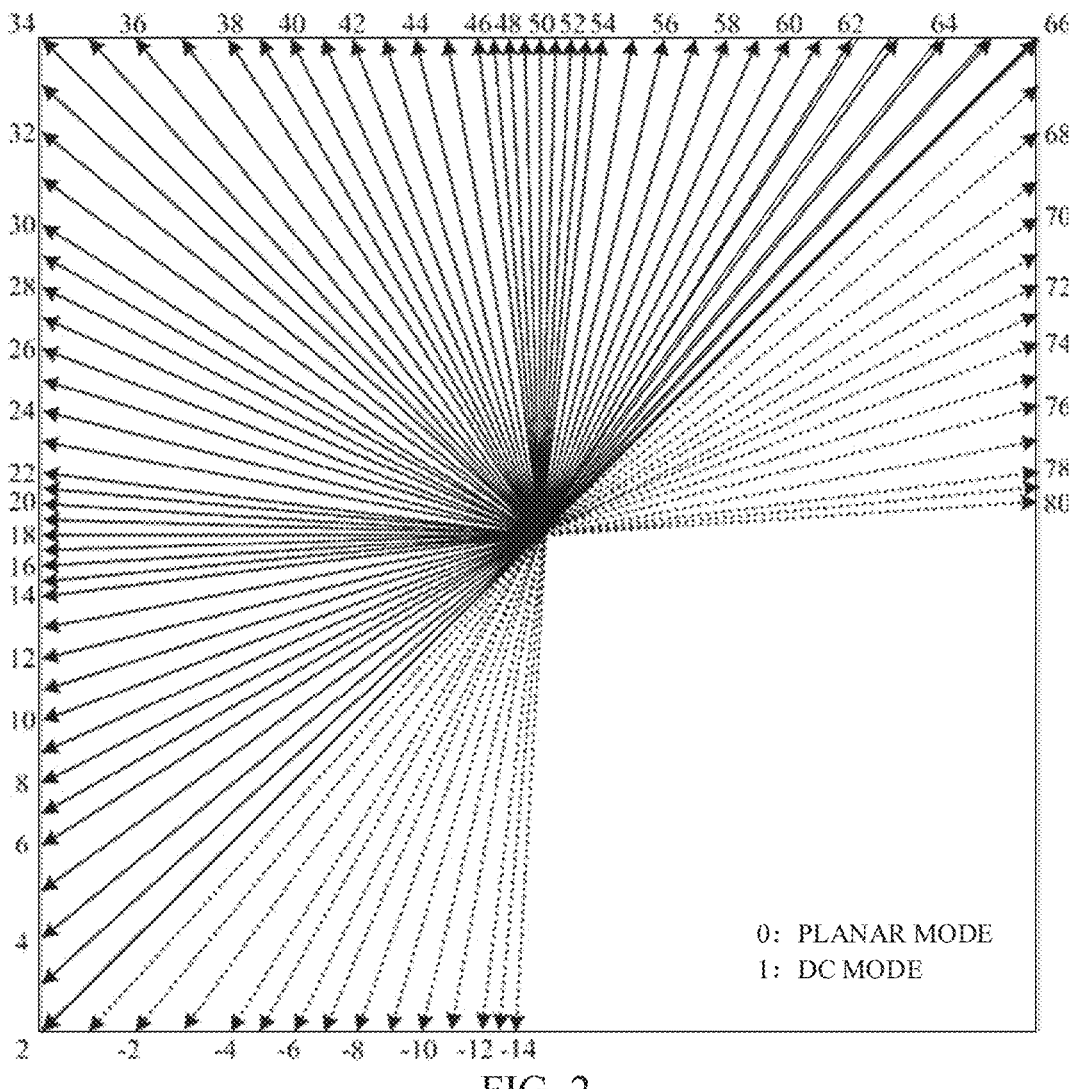
FIG. 2 is a schematic diagram of specific directions of 65 angular prediction modes provided in embodiments of the present disclosure.

FIG. 2 is a schematic diagram of specific directions of 65 angular prediction modes provided in embodiments of the present disclosure.

As illustrated in FIG. 2, index 0 indicates the planar mode, index 1 indicates the DC mode, and indexes −14 to 80 can indicate different angular prediction modes, respectively. Specifically, indexes 2 to 66 indicate traditional angular prediction modes, and indexes −1 to −14 and indexes 67 to 80 indicate wide angular prediction modes. In other words, the traditional intra prediction modes indicated by indexes 2 to 66 can be used for predicting a square block, and the wide angular prediction modes indicated by indexes −1 to −14 and indexes 67 to 80 can be used for predicting a rectangular block.

It can be understood that a prediction mode indicated by index x in the present disclosure can also be referred to as "prediction mode x". For example, an intra prediction mode indicated by index 2 can also be referred to as "intra prediction mode 2".

Figure 3:
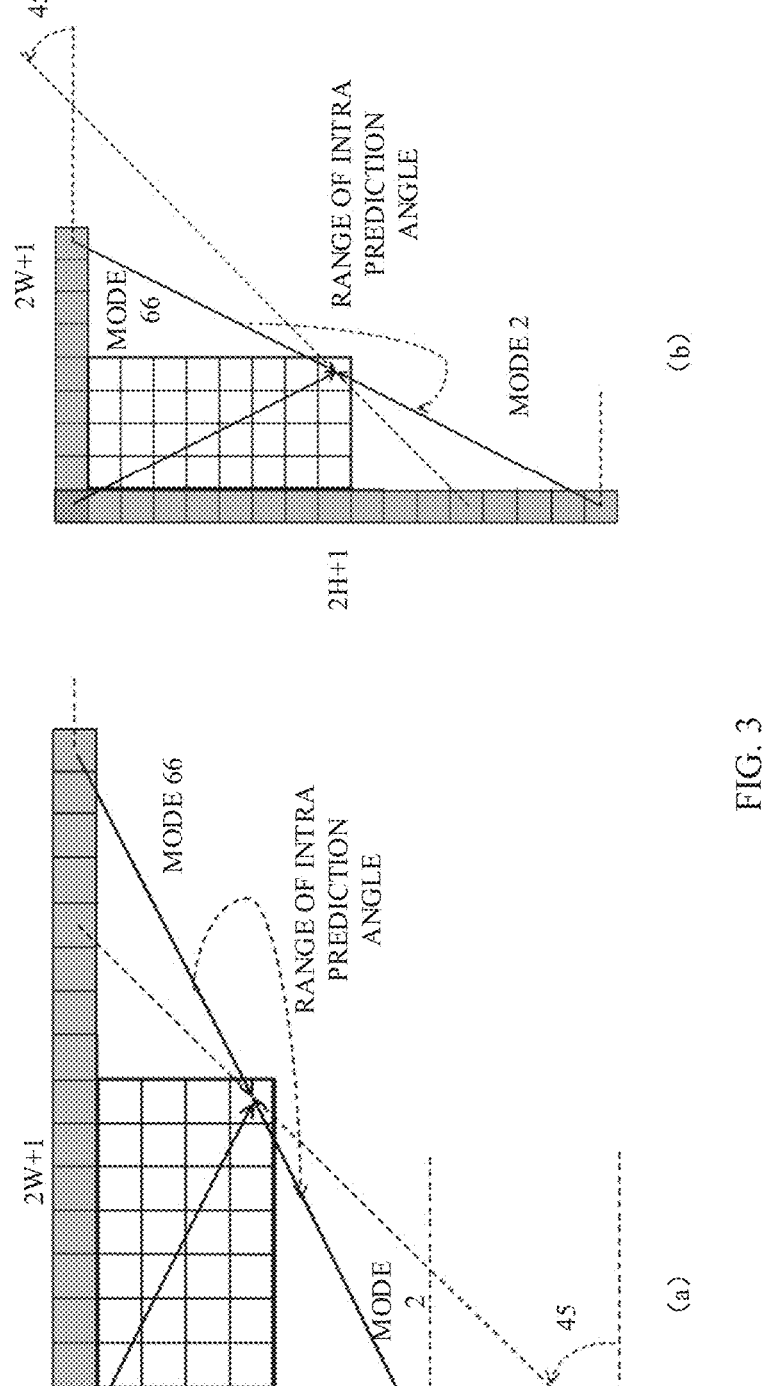
FIG. 3 is an example of reference samples for a wide angular prediction mode provided in embodiments of the present disclosure.

FIG. 3 is an example of reference samples for a wide angular prediction mode provided in embodiments of the present disclosure.

As illustrated in FIG. 3, in the wide angular prediction mode, for a CU of size W×H, the number of top reference samples is 2 W+1, and the number of left reference samples is 2H+1. Specifically, as illustrated in (a) in FIG. 3, when W>H (e.g., a CU of size 8×4), points at the bottom-right corner of the CU cannot be indexed to reference samples close to intra prediction mode 2 (greater than intra prediction mode 2), while there are still some points of the CU that can be indexed to reference samples close to intra prediction mode 66 (greater than intra prediction mode 66). Therefore, some horizontal-like angular modes close to intra prediction mode 2 (greater than intra prediction mode 2) need to be replaced with some vertical-like angular modes close to intra prediction mode 66 (greater than intra prediction mode 66), so as to expand the prediction angle range. Similarly, as illustrated in (b) in FIG. 3, when W<H (e.g., a CU of size 4×8), some points cannot be indexed to reference samples close to intra prediction mode 66 (smaller than intra prediction mode 66), while there are still some samples that can be indexed to reference samples close to intra prediction mode 2 (smaller than intra prediction mode 2). Therefore, some vertical-like angular modes close to intra prediction mode 66 (smaller than intra prediction mode 66) need to be replaced with some horizontal-like angular modes close to intra prediction mode 2 (smaller than intra prediction mode 2), so as to expand the prediction angle range.

In some cases, an intra prediction mode to-be-performed can be determined or selected based on the size of the current block. For example, the wide angular prediction mode can be determined or selected based on the size of the current block for performing intra prediction on the current block. For example, when the current block is a rectangular block (the width and the height are different), the wide angular prediction mode can be used for performing intra prediction on the current block. An aspect ratio of the current block can be used for determining an angular prediction mode to be replaced and an angular prediction mode for replacement in the wide angular prediction mode. For example, when the current block is predicted, any intra prediction mode with an angle not exceeding a diagonal angle of the current block (from the bottom-left corner to the top-right corner of the current block) can be selected as the replaced angular prediction mode.

Other intra prediction modes involved in the present disclosure will be described below.

(1) Matrix-Based Intra Prediction (MIP) Mode

The MIP mode can also be referred to as "matrix-weighted intra prediction mode". Processes involved in the MIP mode can include three main operations, which are a down-sampling process, a matrix multiplication process, and an up-sampling process respectively. Specifically, spatial neighbouring reconstructed samples are down-sampled first through the down-sampling process. Then, a sample sequence after down-sampling is used as an input vector of the matrix multiplication process, i.e., an output vector of the down-sampling process is used as the input vector of the matrix multiplication process, the input vector of the matrix multiplication process is then multiplied with a preset matrix and added with a bias vector, and a sample vector after calculation is output. Finally, an output vector of the matrix multiplication process is used as an input vector of the up-sampling process, and a final prediction block is obtained by up-sampling.

Figure 4:
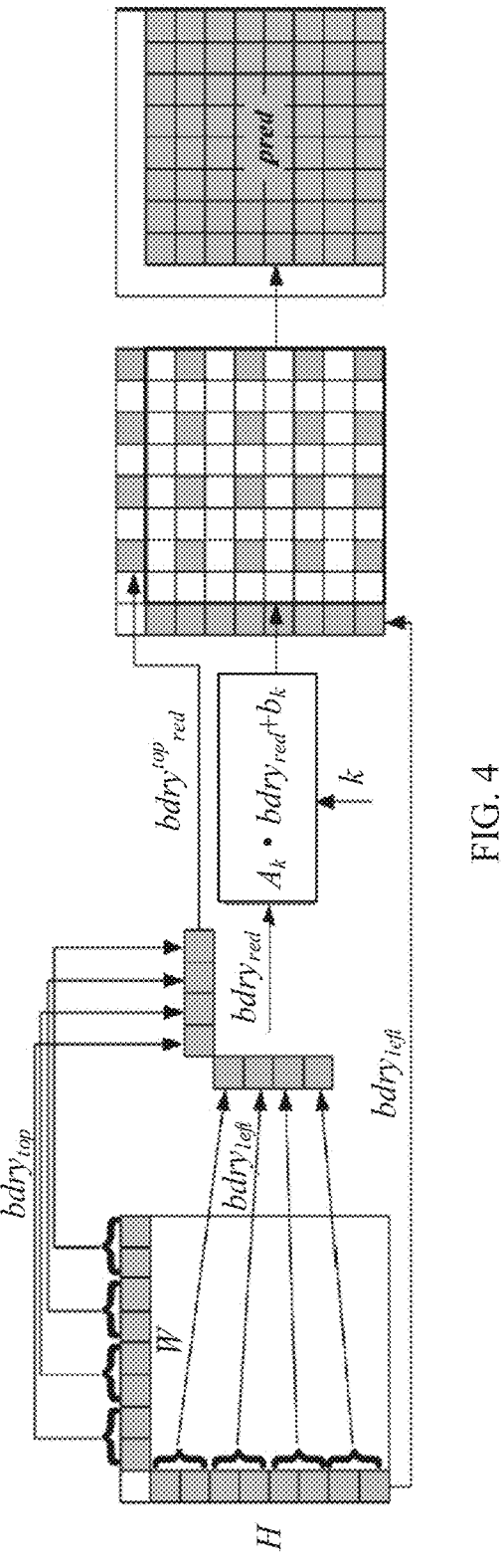
FIG. 4 is a schematic diagram of a matrix-based intra prediction (MIP) mode provided in embodiments of the present disclosure.

FIG. 4 is a schematic diagram of an MIP mode provided in embodiments of the present disclosure.

As illustrated in FIG. 4, for the MIP mode, in the down-sampling process, a down-sampled top neighbouring reconstructed sample vector $bdry_{top}$ is obtained by averaging top neighbouring reconstructed samples of a current CU, and a down-sampled left neighbouring reconstructed sample vector $bdry_{left}$ is obtained by averaging left neighbouring reconstructed samples of the current CU. After $bdry_{top}$ and $bdry_{left}$ are obtained, $bdry_{top}$ and $bdry_{left}$ are used as an input vector $bdry_{red}$ of the matrix multiplication process. Specifically, a sample vector can be obtained based on a top-row vector $bdry_{topred}$ of $bdry_{red}$, $bdry_{left}$, and $A_k \cdot bdry_{red} + b_k$, where $A_k$ is a preset matrix, $b_k$ is a preset bias vector, and k is an index of the MIP mode. After the sample vector is obtained, the sample vector is up-sampled with linear interpolation to obtain a predicted sample block having the number of samples consistent with the actual number of samples of the CU.

In other words, in order to predict a block with the width of W and the height of H, H reconstructed samples in a left column of the current block and W reconstructed samples in a top row of the current block are needed as inputs for the MIP. A prediction block in the MIP is mainly generated based on three operations: reference samples averaging, matrix vector multiplication, and interpolation. A core of MIP is matrix vector multiplication which can be regarded as a process of generating the prediction block from input samples (reference samples) in a matrix vector multiplication. A variety of matrixes are provided in the MIP, different matrixes have different prediction methods, and same input samples will have different results using different matrixes. The process of reference samples averaging and interpolation is a compromise design between performance and complexity. For a larger block, reference sample averaging can be performed to achieve an approximate down-sampling effect, so that the input can be adapted to a smaller matrix, while interpolation achieves an up-sampling effect. In this way, there is no need to provide an MIP matrix for the block of each size, but only matrixes with one or more specific sizes are provided. As the increasing need for compression performance and improvement of hardware capabilities, a more complex MIP can appear in the next generation of standards.

For an MIP mode, the MIP mode can be simplified from a neural network. For example, a matrix used in the MIP mode can be obtained through training. Therefore, the MIP mode has a strong generalization capability and a prediction effect not achieved by a traditional prediction mode. The MIP mode can be a model obtained by performing complexity simplification in hardware and software on a neural network-based intra prediction mode for multiple times. On the basis of a large number of training samples, multiple prediction modes indicate multiple models and parameters, which can better cover the texture of a natural sequence.

The MIP mode is somewhat similar to the planar mode, but clearly, the MIP mode is more complex and flexible than the planar mode.

It can be noted that the number of MIP modes varies for CUs of different block sizes. Exemplarily, the MIP mode has 16 prediction modes for a 4×4-sized CU. The MIP mode has 8 prediction modes for an 8×8-sized CU or a CU with a width or height equal to 4. The MIP mode has 6 prediction modes for CUs of other sizes. Moreover, the MIP mode has a transpose function. For a prediction mode that matches the current size, in the MIP mode, transpose calculations can be tried at the encoding end. Therefore, the MIP mode needs a flag indicating whether the MIP mode is used for the current CU, and if the MIP mode is used for the current CU, a transpose flag also needs to be transmitted to the decoder.

(2) Decoder-Side Intra-Mode Derivation (DIMD) Mode

A core of the DIMD prediction mode is deriving the intra prediction mode at the decoder in the same way as the encoder, to avoid the transmission of an index of the intra prediction mode for the current CU in the bitstream, thereby saving bit overhead.

Specifically, the DIMD mode can include two main operations.

Step 1: a prediction mode is derived.

FIG. 5 is a schematic diagram illustrating deriving a prediction mode via DIMD provided in embodiments of the present disclosure.

As illustrated in (a) of FIG. 5, the DIMD derives a prediction mode by utilizing samples (reconstructed samples on the left and the top of the current block) in a template in the reconstructed region. For example, the template can include the top three rows of neighbouring reconstructed samples, the left three columns of neighbouring reconstructed samples, and the corresponding top-left neighbouring reconstructed samples of the current block. Based on this, multiple gradient values can be determined in the template according to a window (e.g., a window as illustrated in (a) of FIG. 5 or a window as illustrated in (b) of FIG. 5), where each of the gradient values can be used for obtaining an intra prediction mode (ipm) adapted to its direction of gradient. In this way, the encoder can use a prediction mode corresponding to the maximum gradient value and a prediction mode corresponding to the second maximum gradient value among the multiple gradient values as derived prediction modes. For example, as illustrated in (b) of FIG. 5, for blocks of size 4×4, all samples that need to determine gradient values are analyzed and a corresponding histogram of gradients is obtained. For example, as illustrated in (c) of FIG. 5, for blocks of other sizes, all samples that need to determine gradient values are analyzed and a corresponding histogram of gradients is obtained. Finally, a prediction mode corresponding to the maximum gradient and a prediction mode corresponding to the second-maximum gradient in the histogram of gradients are taken as the derived prediction modes.

Certainly, the histogram of gradients in the present disclosure is only an example for determining the derived prediction modes, and can be implemented in various simple forms in specific implementations, which is not limited in the present disclosure. In addition, the present disclosure does not limit a manner in which the histogram of gradients is obtained. For example, the histogram of gradients can be obtained by using the Sobel operator or other manners.

Step 2: a prediction block is derived.

Figure 6:
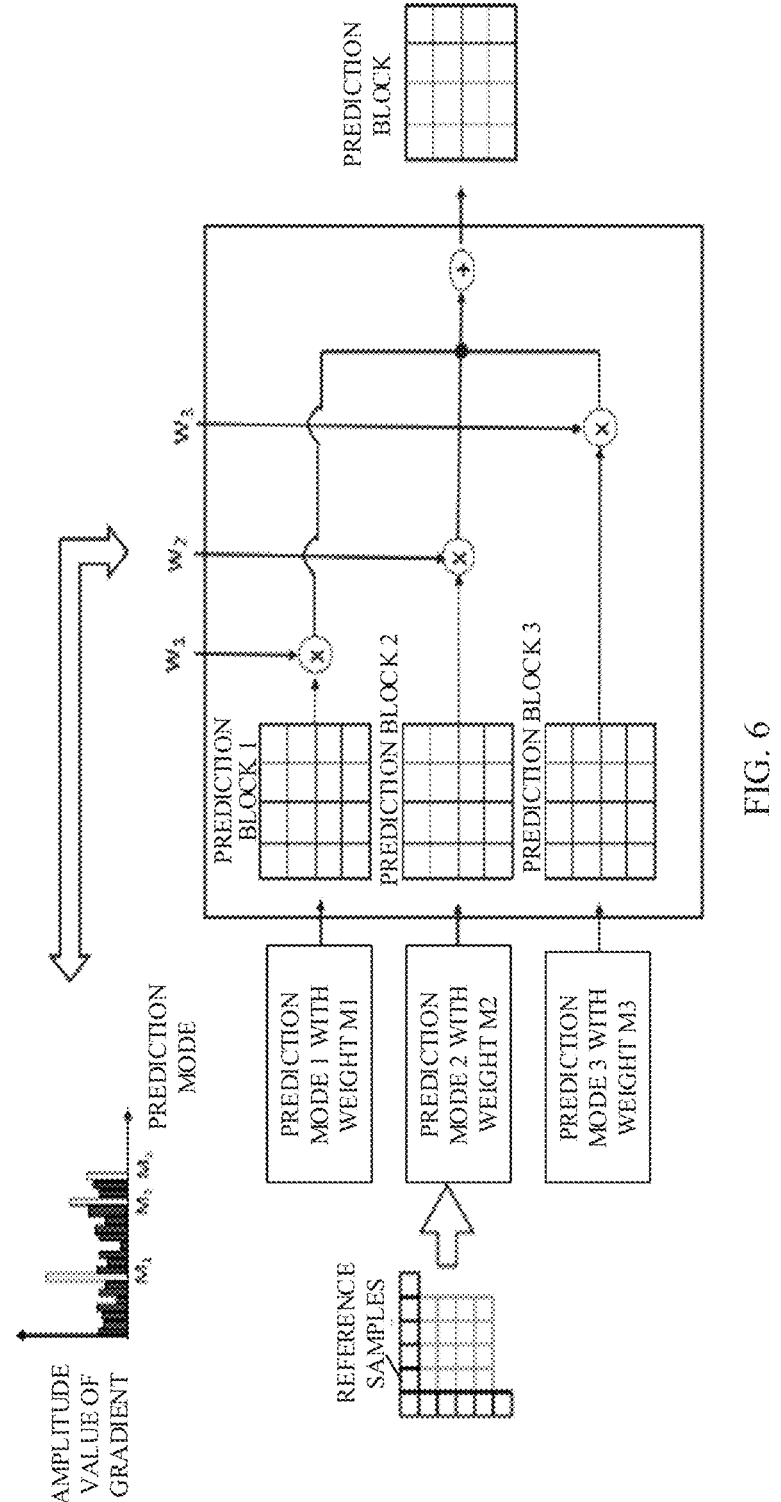
FIG. 6 is a schematic diagram illustrating derivation of a prediction block via DIMD provided in embodiments of the present disclosure.

FIG. 6 a schematic diagram illustrating deriving a prediction block via DIMD provided in embodiments of the present disclosure.

As illustrated in FIG. 6, the encoder can weight prediction values corresponding to three intra prediction modes (the planar mode as well as two intra prediction modes derived via the DIMD). The same prediction block derivation mode is used at both the encoder and the decoder to obtain a prediction block of the current block. Assuming that the prediction mode corresponding to the maximum gradient value is prediction mode 1 and the prediction mode corresponding to the second maximum gradient value is prediction mode 2, then the encoder evaluates the following two conditions: 1) the gradient of prediction mode 2 is not 0, and 2) neither prediction mode 1 nor prediction mode 2 is the planar mode or a DC prediction mode.

If both conditions are not simultaneously satisfied, only prediction mode 1 is used for calculating predicted sample values of the current block. That is, the regular prediction process is applicable to prediction mode 1. Otherwise, if both conditions are satisfied, the prediction block of the current block will be derived using a weighted average approach. A specific method is as follows. A weight of the planar mode is 1/3, and a total weight of prediction mode 1 and prediction mode 2 is 2/3. A weight of prediction mode 1 is obtained by dividing the amplitude value of gradient of prediction mode 1 by a sum of the amplitude value of gradient of prediction mode 1 and the amplitude value of gradient of prediction mode 2, and a weight of prediction mode 2 is obtained by dividing the amplitude value of gradient of prediction mode 2 by the sum of the amplitude value of gradient of prediction mode 1 and the amplitude value of gradient of prediction mode 2. Finally, the prediction blocks are obtained based on the three prediction modes, i.e., prediction block 1 is obtained based on the planar mode, prediction block 2 is obtained based on prediction mode 1, and prediction block 3 is obtained based on prediction mode 2, and then the prediction block of the current block is obtained by performing weighted average on prediction block 1, prediction block 2, and prediction block 3. The decoder obtains the prediction block with the same operations.

In other words, weights at Step 2 are calculated as follows.

$$\text{Weight(PLANAR)} = 1/3;$$

$$\text{Weight(mode1)} = 2/3 * (\text{amp1}/(\text{amp1} + \text{amp2})); \text{ and}$$

$$\text{Weight(mode2)} = 1 - \text{Weight(PLANAR)} - \text{Weight(mode1)};$$

where mode1 indicates prediction mode 1, mode2 indicates prediction mode 2, amp1 indicates the amplitude value of gradient of prediction mode 1, and amp2 indicates the amplitude value of gradient of prediction mode 2. In the DIMD mode, a flag needs to be transmitted to the decoder for indicating whether the DIMD mode is used for the current CU.

Certainly, performing weighted average is only an example of the present disclosure and cannot be construed as a limitation to the present disclosure.

To summarize, in the DIMD, the intra prediction modes are selected by analyzing the gradients of the reconstructed samples, and the two intra prediction modes and the planar mode are weighted according to the results of the analysis. The advantage of the DIMD is that if the DIMD mode is selected for the current block, there is no need to indicate which intra prediction mode is used in the bitstream, but it is derived by the decoder itself through the above process, thereby saving overhead to a certain extent.

(3) Template-Based Intra-Mode Derivation (TIMD) Mode

The technical principle of the TIMD mode is similar to that of the DIMD mode, and both the encoder and the decoder perform the same operations to derive the prediction mode to reduce the overhead of transmitting mode indexes. The TIMD mode can be understood as two main parts. First, cost information of each prediction mode is calculated according to a template. A prediction mode corresponding to the minimum cost and a prediction mode corresponding to the second-minimum cost are selected. The prediction mode corresponding to the minimum cost is denoted as prediction mode 1, and the prediction mode corresponding to the second-minimum cost is denoted as prediction mode 2. If a ratio of the second-minimum cost (costMode2) to the minimum cost (costMode1) satisfies a preset condition, such as costMode2<2*costMode1, weighted fusion is performed on a prediction block corresponding to prediction mode 1 and a prediction block corresponding to prediction mode 2 according to a weight corresponding to prediction mode 1 and a weight corresponding to prediction mode 2, so as to obtain a final prediction block.

Exemplarily, the weight corresponding to prediction mode 1 and the weight corresponding to the prediction mode 2 are determined according to the following manner:

$$\text{weight1} = \text{costMode2}/(\text{costMode1} + \text{costMode2}); \text{ and}$$

$$\text{weight2} = 1 - \text{weight1};$$

where weight1 indicates the weight for the prediction block corresponding to prediction mode 1, and weight2 indicates the weight for the prediction block corresponding to prediction mode 2. However, if the ratio of the second-minimum cost (costMode2) to the minimum cost (costMode1) does not satisfy the preset condition, the weighted fusion on the prediction blocks is not performed, and the prediction block corresponding to prediction mode 1 is taken as the TIMD prediction block.

It can be noted that when the TIMD mode is used for performing intra prediction on the current block, if no available neighbouring reconstructed sample is included in a reconstructed-sample template of the current block, in the TIMD mode, the planar mode is selected for performing intra prediction on the current block, i.e., the weighted fusion is not performed. Similar to the DIMD mode, in the TIMD mode, a flag needs to be transmitted to the decoder for indicating whether the TIMD mode is used for the current CU.

Figure 7:
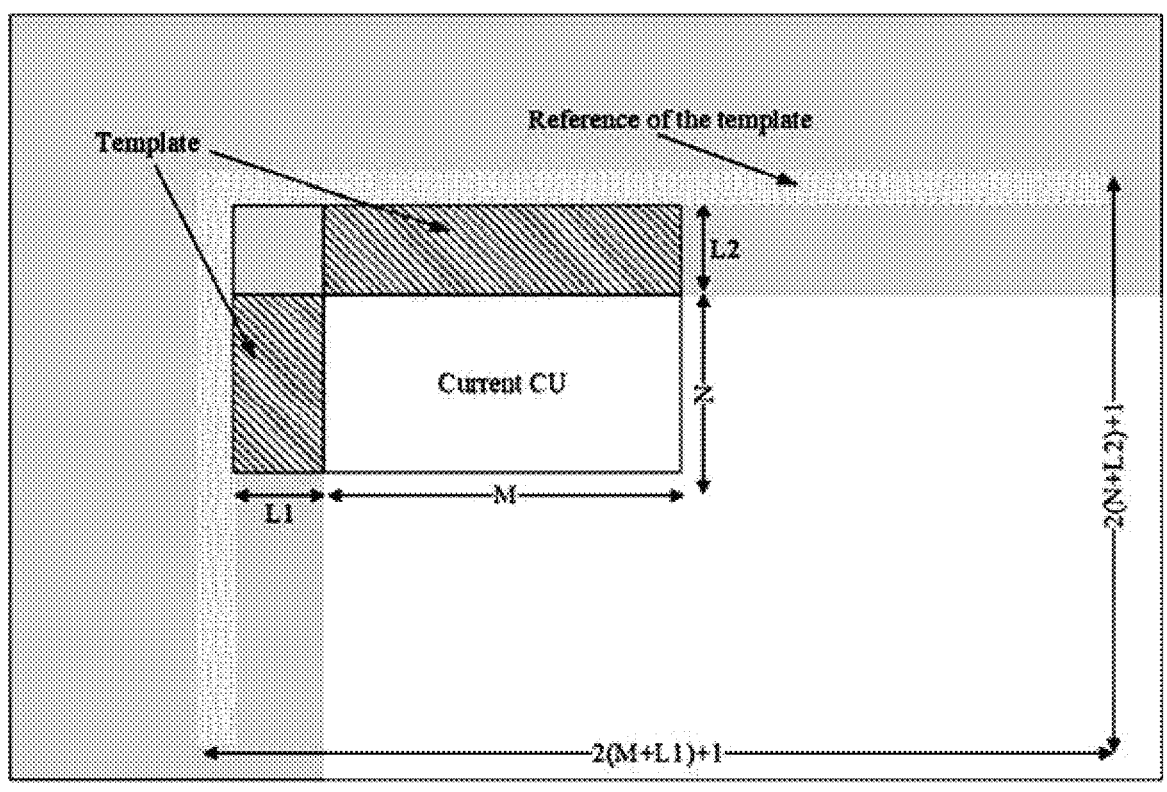
FIG. 7 is a schematic diagram illustrating a template used for template-based intra-mode derivation (TIMD) provided in embodiments of the present disclosure.

FIG. 7 is a schematic diagram of a template used for TIMD provided in embodiments of the present disclosure.

As illustrated in FIG. 7, if the current block is a CU with a width equal to M and a height equal to N, the encoder and the decoder can select a reference of template of the current block based on a CU with a width equal to 2 (M+L1)+1 and a height equal to 2 (N+L2)+1, to calculate the template of the current block. In this case, if no available neighbouring reconstructed sample is included in the template of the current block, in the TIMD mode, the planar mode is selected for performing intra prediction on the current block. For example, the available neighbouring reconstructed samples can be samples adjacent to the left and the top of the current CU in FIG. 7, i.e., no available reconstructed samples are present in regions padded with oblique lines. In other words, if there is no available reconstructed sample in the regions padded with oblique lines, in the TIMD mode, the planar mode is selected to perform intra prediction on the current block.

Except for the boundary case, when the current block is encoded and decoded, theoretically, reconstructed values can be obtained at the left and the top of the current block, that is, available neighbouring reconstructed samples are included in the template of the current block. In a specific implementation, the decoder can predict the template in a certain intra prediction mode, and compare a prediction value with a reconstructed value to obtain a cost of the intra prediction mode in the template, for example, a sum of absolute difference (SAD), a sum of absolute transformed difference (SATD), and a sum of squared error (SSE). Since the template is adjacent to the current block, the reconstructed samples in the template have a correlation with samples in the current block. Therefore, a prediction mode used for the template can be used to estimate the prediction mode used for the current block. In the TIMD, the template is predicted in some candidate intra prediction modes to obtain costs of the candidate intra prediction modes in the template, and prediction values in one or two intra prediction modes with the lowest costs are taken as intra prediction values of the current block. If a difference in two costs corresponding to the two intra prediction modes in the template is small, weighted average is performed on prediction values of the two intra prediction modes, to improve the compression performance. Optionally, weights of the prediction values of the two prediction modes are related to the costs, for example, the weights are inversely proportional to the costs.

To summarize, in the TIMD, the intra prediction modes are selected according to prediction effects of the intra prediction modes in the template, and the two intra prediction modes are weighted according to the costs in the template. The advantage of the TIMD is that if the TIMD mode is selected for the current block, there is no need to indicate which intra prediction mode is used in the bitstream, but it is derived by the decoder itself through the above process, thereby saving overhead to a certain extent.

Through the above brief introductions to several intra prediction modes, it is not difficult to find that the technical principle of the DIMD mode is similar to that of the TIMD prediction mode, and the encoder and the decoder perform the same operations to infer the prediction mode of the current CU. This prediction mode can avoid transmission of an index of the prediction mode with acceptable complexity, thereby reducing overhead and improving compression efficiency. However, due to the limitation of reference information and the fact that the tool itself does not have much part to improve the prediction quality, the DIMD mode and the TIMD mode work better in large regions with consistent texture characteristics. The technology does not perform well if the texture changes slightly or the template region cannot be covered.

In addition, both the DIMD mode and the TIMD mode involve fusion or weighted prediction on prediction blocks obtained based on multiple traditional prediction modes. Fusion of the prediction blocks can produce effects that cannot be achieved by a single prediction mode. The DIMD mode introduces the planar mode as an additional weighted prediction mode to increase the spatial correlation between neighbouring reconstructed samples and predicted samples, thereby improving the prediction effect of intra prediction. However, due to the simplicity of the prediction principle of the planar mode, taking the planar mode prediction as the additional weighted prediction mode can have a counterproductive effect for prediction blocks with significant differences between the top-right corner and the bottom-left corner.

(4) Geometric Partitioning Mode (GPM) and Angular Weighted Prediction (AWP)

In the video coding standard, traditional unidirectional prediction only searches for one reference block of the same size as the current block, while traditional bidirectional prediction uses two reference blocks of the same size as the current block, where a sample value of each sample in the prediction block is an average of samples at corresponding positions in the two reference blocks, that is, all samples in each reference block account for (or contribute) 50%. Further, bidirectional weighted prediction allows the proportions of the two reference blocks to be different, such as 75% for all samples in the first reference block and 25% for all samples in the second reference block. However, the proportions of all samples in the same reference block are the same. In addition, other optimization methods, such as decoder-side motion vector refinement (DMVR), bi-directional optical flow (BIO or BDOF), etc., can cause some changes in the reference or predicted samples.

In GPM or AWP, two reference blocks of the same size as the current block are also used, but in some sample positions, 100% of the sample values at the corresponding positions in the first reference block are used, in some sample positions, 100% of the sample values at the corresponding positions in the second reference block are used, and in a boundary area (or referred to as "blending area"), the sample values at the corresponding positions in these two reference blocks are used according to a certain proportion. Weights of the boundary area are also gradually blending. The allocation of these weights is determined by a weight derivation mode of GPM or AWP. A weight of each sample position is determined by the weight derivation mode of GPM or AWP.

Certainly, in some cases such as when the block size is very small, in some GPM or AWP modes, it cannot be guaranteed that in some sample positions, 100% of the sample values at the corresponding positions in the first reference block are used and in some sample positions, 100% of the sample values at the corresponding positions in the second reference block are used. In this case, it can also be considered that in GPM or AWP, two reference blocks of different sizes from the current block are used, that is, each reference block takes a required part of the current block. That is, a part with a non-zero weight(s) is used as a reference block, and a part with a zero weight(s) is eliminated, which is not limited in the present disclosure.

Figure 8:
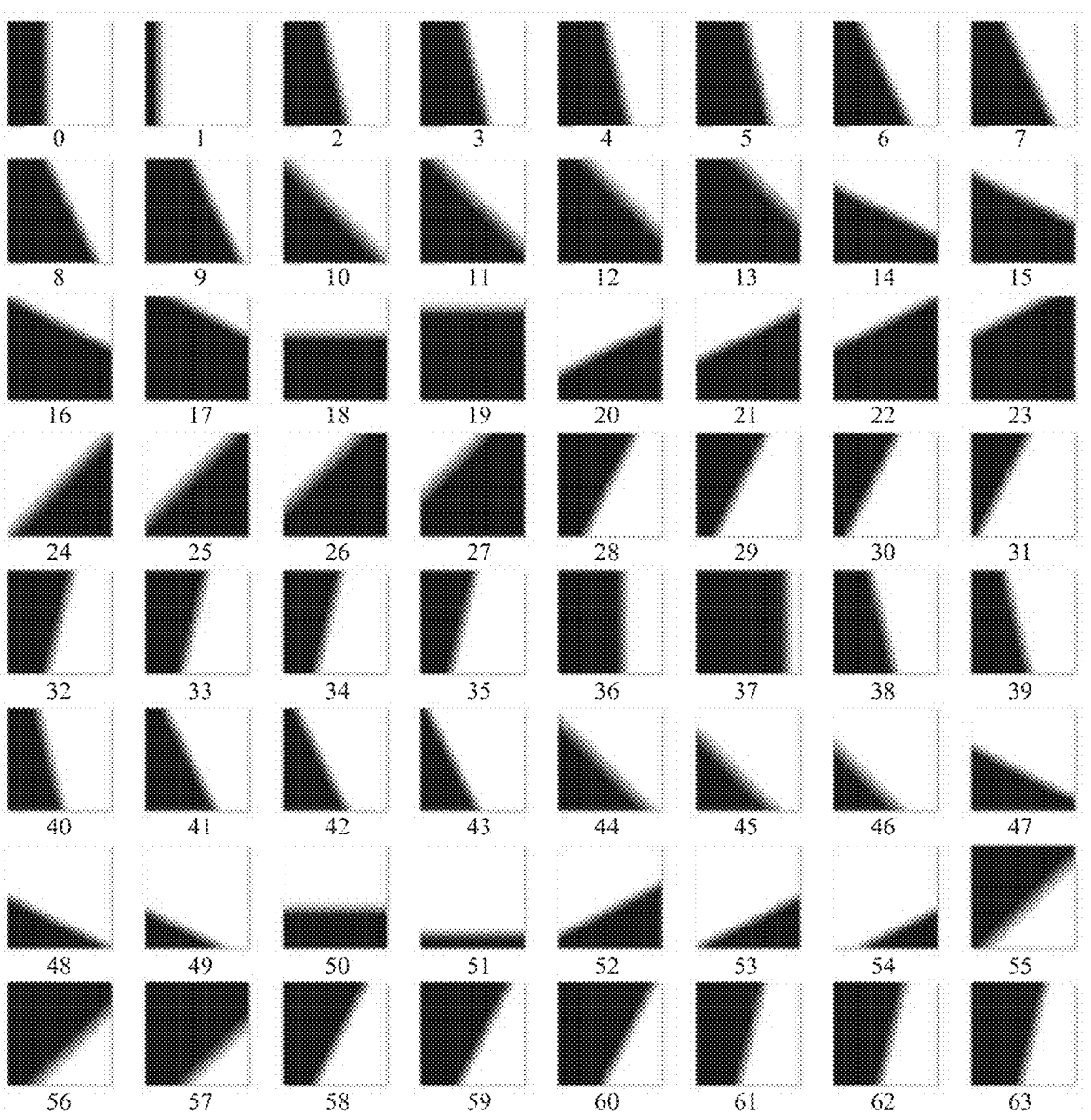
FIG. 8 is an example of weight maps corresponding to 64 weight derivation modes in a geometric partitioning mode (GPM) for a square block provided in embodiments of the present disclosure.

FIG. 8 is an example of weight maps corresponding to 64 weight derivation modes in a GPM for a square block provided in embodiments of the present disclosure.

FIG. 8 illustrates weight maps corresponding to 64 weight derivation modes in the GPM for a square block. For a weight map corresponding to each weight derivation mode, a black area indicates that a weight value of a corresponding position in the first reference block is 0%, a white area indicates that a weight value of a corresponding position in the first reference block is 100%, and a gray area indicates that weight values of corresponding positions in the first reference block are greater than 0% and less than 100%, depending on the shade of the color. A weight value of a position in the second reference block is 100% minus a weight value of the corresponding position in the first reference block.

Figures 9, 10:
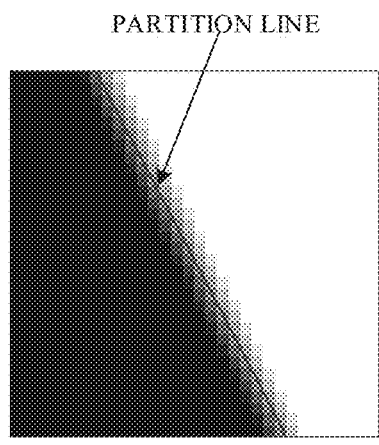
FIG. 9 is an example of a partition line of a weight derivation mode provided in embodiments of the present disclosure.
FIG. 10 is an example of weight maps corresponding to 56 weight derivation modes in angular weighted prediction (AWP) for a square block provided in embodiments of the present disclosure.

FIG. 9 is an example of a partition line of a weight derivation mode provided in embodiments of the present disclosure.

As illustrated in FIG. 9, the partition line of the weight derivation mode can be a line formed by points where weights of two prediction modes corresponding to the GPM are the same. In other words, in a weight matrix of the GPM, the partition line is the line formed by points where weights of two prediction modes corresponding to the GPM are the same. In other words, the partition line can be a line formed by points where weights of two prediction modes corresponding to the GPM are the same in an area where weights change in the weight matrix of the GPM. In other words, the partition line is a line formed by points with median weights, or the partition line is a line formed by points corresponding to the median weights. The points with the median weights may be or may not be located in the middle of all samples. For example, the median weight can be 4 among weights 0 to 8.

A weight derivation method will be described below with GPM as an example.

The encoder can determine a corresponding partition line according to each weight derivation mode, and then determine a corresponding weight matrix based on the partition line. For example, the encoder can determine, according to Table 1, an angle index variable angleIdx and a distance index variable distanceIdx which correspond to the weight derivation mode, and determine a weight derivation mode merge_gpm_partition_idx. The angle index variable angleIdx and the distance index variable distanceIdx can be considered as variables for determining the partition line, that is, they are used for determining an angle and an offset of the partition line, respectively. After the encoder determines a partition line corresponding to each weight derivation mode, the encoder can determine a weight matrix corresponding to each weight derivation mode based on the partition line corresponding to each weight derivation mode.

TABLE 1

| merge_gpm_partition_idx | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| angleIdx | 0 | 0 | 2 | 2 | 2 | 2 | 3 | 3 | 3 | 3 | 4 | 4 | 4 | 4 | 5 | 5 |
| distanceIdx | 1 | 3 | 0 | 1 | 2 | 3 | 0 | 1 | 2 | 3 | 0 | 1 | 2 | 3 | 0 | 1 |

| merge_gpm_partition_idx | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|
| angleIdx | 5 | 5 | 8 | 8 | 11 | 11 | 11 | 11 | 12 | 12 | 12 | 12 | 13 | 13 | 13 | 13 |
| distanceIdx | 2 | 3 | 1 | 3 | 0 | 1 | 2 | 3 | 0 | 1 | 2 | 3 | 0 | 1 | 2 | 3 |

| merge_gpm_partition_idx | 32 | 33 | 34 | 35 | 36 | 37 | 38 | 39 | 40 | 41 | 42 | 43 | 44 | 45 | 46 | 47 |
|---|---|---|---|---|---|---|---|---|---|---|---|---|---|---|---|---|
| angleIdx | 14 | 14 | 14 | 14 | 16 | 16 | 18 | 18 | 18 | 19 | 19 | 19 | 20 | 20 | 20 | 21 |
| distanceIdx | 0 | 1 | 2 | 3 | 1 | 3 | 1 | 2 | 3 | 1 | 2 | 3 | 1 | 2 | 3 | 1 |

| merge_gpm_partition_idx | 48 | 49 | 50 | 51 | 52 | 53 | 54 | 55 | 56 | 57 | 58 | 59 | 60 | 61 | 62 | 63 |
|---|---|---|---|---|---|---|---|---|---|---|---|---|---|---|---|---|
| angleIdx | 21 | 21 | 24 | 24 | 27 | 27 | 27 | 28 | 28 | 28 | 29 | 29 | 29 | 30 | 30 | 30 |
| distanceIdx | 2 | 3 | 1 | 3 | 1 | 2 | 3 | 1 | 2 | 3 | 1 | 2 | 3 | 1 | 2 | 3 |

FIG. 10 is an example of weight maps corresponding to 56 weight derivation modes in an AWP for a square block provided in embodiments of the present disclosure.

FIG. 10 illustrates weight maps corresponding to the 56 weight derivation modes in the AWP for the square block. For a weight map corresponding to each weight derivation mode, a black area indicates that a weight value of a corresponding position in the first reference block is 0%, a white area indicates that a weight value of a corresponding position in the first reference block is 100%, and a gray area indicates that weight values of corresponding positions in the first reference block are greater than 0% and less than 100%, depending on the shade of the color. A weight value of a position in the second reference block is 100% minus a weight value of the corresponding position in the first reference block.

It can be noted that weights in GPM and AWP are derived differently. In GPM, an angle and an offset are determined according to each weight derivation mode, and then a weight map corresponding to each weight derivation mode is calculated. In AWP, a one-dimensional weight line is first generated according to each weight derivation mode, and then the one-dimensional weight line is spread across the entire picture in a manner similar to the intra angular prediction, to obtain the weight map corresponding to each weight derivation mode. Certainly, in other alternative embodiments, the weight map corresponding to each weight derivation mode can be referred to as "weight matrix".

As illustrated in Table 1, the weight derivation modes include 64 modes (e.g., 64 modes as illustrated in FIG. 8) whose indexes (merge_gpm_partition_idx) have values from 0 to 63. Each of the 64 weight derivation modes can correspond to one angle index variable angleIdx and one distance index variable distanceIdx. In other words, each weight derivation mode can correspond to one partition line. Certainly, one angle index variable angleIdx or one distance index variable distanceIdx can correspond to an index(s) of one or more weight derivation modes. Table 1 is only an example of the present disclosure and cannot be construed as a limitation to the present disclosure.

Since the GPM can be used for three components (e.g., Y, Cb, and Cr), a process of generating a predicted sample matrix for GPM for one component can be divided into a sub-process, that is, a weighted sample prediction process for GPM. This process can be invoked for the three components, but parameters invoked are different. The present disclosure takes a luma component as an example for explanation. Exemplarily, a prediction matrix predSamplesL [xL][yL] of a current luma block can be derived through the weighted sample prediction process for GPM, where xL=0 . . . cbWidth−1 and yL=0 . . . cbHeight−1. The width of the current block nCbW is set to cbWidth, and the height of the current block nCbH is set to cbHeight.

Inputs to the weighted sample prediction process for GPM are: the width of the current block nCbW and the height of the current block nCbH; two (nCbW)×(nCbH) predicted sample matrixes predSamplesLA and predSamplesLB; a variable angleIdx specifying the angle index of the GPM partition; a variable distanceIdx specifying the distance index of the GPM; a variable cIdx specifying a component index, for example, cIdx–0 can indicate a luma component. An output of the weighted sample prediction process for GPM is: (nCbW)×(nCbH) GPM predicted sample matrix pbSamples[x][y], where x=0 . . . nCbW−1 and y=0 . . . nCbH−1.

The predicted sample matrix pbSamples[x][y] can be derived as follows. Exemplarily, firstly, variables nW, nH, shift1, offset1, displacementX, displacementY, partFlip, and shiftHor are derived as follows:

$$nW = (cIdx == 0) \ ? \ nCbW : nCbW * SubWidthC.$$

$$nH = (cIdx == 0) \ ? \ nCbH : nCbH * SubHeightC.$$

$$shift1 = Max(5., 17 - BitDepth),$$

where $BitDepth$ is the bit depth of the coding $$offset1 = 1 << (shift1 - 1).$$

$$displacementX = angleIdx.$$

$$displacementY = (angleIdx + 8) \% 32.$$

$$partFlip = (angleIdx >= 13 \&\& \ angleIdx <= 37) \ ? \ 0:1.$$

$$shiftHor =$$

$$(angleIdx \% 16 == 8 \ || \ (angleIdx \% 16 \ != 0 \&\& \ nH >= nW)) ? \ 0:1.$$

Then, variables offsetX and offsetY can be derived as follows:

If the value of shiftHor is 0:

$$offsetX = (-nW) >> 1;$$

$$offsetY = ((-nH) >> 1) +$$
$$(angleIdx < 16 \ ? \ (distanceIdx * nH) >> 3 : -((distanceIdx * nH) >> 3));$$

Otherwise (shiftHor is equal to 1):

$$offsetX = ((-nW) >> 1) +$$
$$(angleIdx < 16 \ ? \ (distanceIdx * nW) >> 3 : -((distanceIdx * nW) >> 3);$$

$$offsetY = (-nH) >> 1.$$

Then, the predicted sample matrix pbSamples[x][y] with x–0 . . . nCbW−1 and y–0 . . . nCbH−1 is derived as follows.

Variables xL and yL are derived as follows:

$$xL = (cIdx == 0) \ ? \ x : x * SubWidthC;$$

$$yL = (cIdx == 0) \ ? \ y : y * SubHeightC;$$

$$weightIdx = (((xL + offsetX) << 1) + 1) * disLut[displacementX] +$$
$$(((yL + offsetY) << 1) + 1) * disLut[displacementY].$$

disLut[displacementX] can be determined according to Table 2.

TABLE 2

| idx | 0 | 2 | 3 | 4 | 5 | 6 | 8 | 10 | 11 | 12 | 13 | 14 |
|---|---|---|---|---|---|---|---|---|---|---|---|---|
| disLut[idx] | 8 | 8 | 8 | 4 | 4 | 2 | 0 | −2 | −4 | −4 | −8 | −8 |
| idx | 16 | 18 | 19 | 20 | 21 | 22 | 24 | 26 | 27 | 28 | 29 | 30 |
| disLut[idx] | −8 | −8 | −8 | −4 | −4 | −2 | 0 | 2 | 4 | 4 | 8 | 8 |

$$weightIdxL = partFlip \ ? \ 32 + weightIdx : 32 - weightIdx;$$

$$wValue = Clip3(0, 8, (weightIdxL + 4) >> 3);$$

$$pbSamples[x][y] =$$

$$Clip3(0, 1(1 << BitDepth) - 1, (predSamplesLA[x][y] * wValue +$$

$$predSamplesLB[x][y] * (8 - wValue) + offset1) >> shift1).$$

where pbSamples[x][y] indicates a predicted sample at point (x, y), w Value indicates a weight of a prediction value predSamplesLA[x][y] of a prediction matrix of a prediction mode at the point (x, y), and (8–wValue) is a weight of a prediction value predSamplesLB[x][y] of a prediction matrix of another prediction mode at the point (x, y).

It can be noted that for one weight derivation mode, a weight value wValue can be derived for each point based on the weight derivation mode, and then a prediction value pbSamples[x][y] of the GPM is calculated. In this way, the weight wValue does not need to be written in the form of a matrix, but it can be understood that if the wValue of each position is saved in a matrix, then a weight matrix is formed. The weight is calculated for each point and weighting is performed for each point to obtain the prediction value of the GPM, or all weights are calculated and then weighting is performed uniformly to obtain the predicted sample matrix of the GPM, both of which have the same principle. The term "weight matrix" in many descriptions in the present disclosure is for ease of understanding, and the illustration with the weight matrix is more intuitive. In fact, the description can also be made according to the weight of each position. For example, the weight-matrix derivation mode can also be referred to as "weight derivation mode", which is not limited in the present disclosure.

In addition, a CU, a PU, and a TU are partitioned in rectangular partitioning. However, GPM or AWP achieves the effect of non-rectangular partitioning for prediction without actual partitioning. GPM and AWP use a weight mask for two reference blocks, namely the weight map or the weight matrix mentioned above. From the mask, the weights of the two reference blocks in generating the prediction block are determined, or it can be understood that one part of the prediction block is from the first reference block and the other part of the prediction block is from the second reference block, and the blending area is obtained by weighting the corresponding positions in the two reference blocks, which allows a smoother transition. Neither GPM nor AWP partitions the current block into two CUs or PUs. Therefore, after prediction, the current block is processed as a whole during transformation, quantization, inverse transformation, and inverse quantization of the residuals.

It can be noted that in GPM, two inter prediction blocks can be combined by using a weight matrix. In the present disclosure, any two prediction blocks, such as two inter prediction blocks, two intra prediction blocks, or one inter prediction block and one intra prediction block, can be combined. Even in screen content coding, a prediction block in an intra block copy (IBC) mode or a prediction block in a palette mode can be used as one or two prediction blocks among the two prediction blocks. For ease of expression, in the present disclosure, the intra mode, the inter mode, the IBC mode, and the palette mode are collectively referred to as "prediction mode". The prediction mode can be understood as information based on which the encoder and the decoder can generate a prediction block of the current block. Exemplarily, in intra prediction, the prediction mode can be a certain intra prediction mode, such as the DC mode, the planar mode, various intra angular prediction modes, etc. Certainly, one or some auxiliary information can also be superimposed, such as a method for optimizing intra reference samples, an optimization method (such as filtering) after a preliminary prediction block is generated, etc. Exemplarily, in inter prediction, the prediction mode can be a merge mode, a merge with motion vector difference (MMVD) mode, or an advanced motion vector prediction (AMVP) mode. Exemplarily, the prediction mode can be unidirectional prediction, bidirectional prediction, or multi-hypothesis prediction. Further, if the unidirectional prediction is used for the inter prediction mode and one motion information can be determined, the prediction block can be determined based on the motion information. If the bidirectional prediction is used for the inter prediction mode and two motion information can be determined, the prediction block can be determined based on the motion information.

Figure 11:
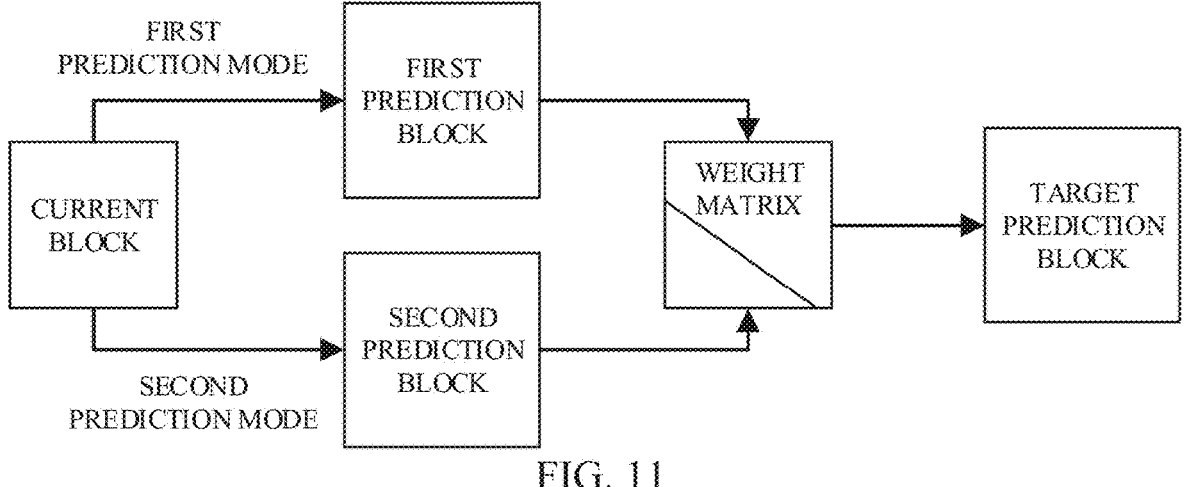
FIG. 11 is a schematic diagram of a GPM or an AWP provided in embodiments of the present disclosure.

FIG. 11 is a schematic diagram of a GPM or an AWP provided in embodiments of the present disclosure.

As illustrated in FIG. 11, information that needs to be determined in the GPM can be expressed as one weight derivation mode and two prediction modes. The weight derivation mode is used for determining a weight matrix or a weight, and each of the two prediction modes is used for determining one prediction block or prediction value. The weight derivation mode is also referred to as "partitioning mode" or "weight-matrix derivation mode". The two prediction modes can be the same or different, for example, including but not limited to the intra prediction mode, the inter prediction mode, the IBC mode, and the palette mode.

Contents related to a transform of a residual block are described below.

During encoding, the current block is predicted first. During the prediction, spatial or temporal correlation can be used for obtaining a picture that is the same as or similar to the current block. For a block, the prediction block may be exactly the same as the current block, but it is difficult to ensure this for all blocks in a video. Especially for a natural video or a video captured by a camera, due to factors such as complex textures of the picture, noise in the picture, etc., the prediction block and the current block are usually very similar but different. Furthermore, it is difficult to completely predict the current block due to irregular motion, distortion and deformation, occlusion, variations of luma, etc., in the video. Therefore, in the hybrid coding framework, a residual picture is obtained by subtracting a prediction picture from an original picture of the current block, or a residual block is obtained by subtracting a prediction block from a current block. The residual block is usually simpler than the original picture, therefore prediction can significantly improve the compression efficiency. The residual block is not directly encoded, instead, the residual block is usually transformed first. Transform refers to transforming the residual picture from a spatial domain to a frequency domain, to remove the correlation of the residual picture. After the residual picture is transformed into the frequency domain, since most of the energy are concentrated in a low-frequency region, most of the transformed non-zero coefficients are concentrated at the top-left corner. Then, quantization is used for further compression. Furthermore, since human eyes are not sensitive to high frequencies, a larger quantization step size can be used in a high-frequency region.

The picture transform technology is to transform the original picture so as to represent the original picture with an orthogonal function or an orthogonal matrix, where the transform is two-dimensional linear reversible. Generally, the original picture is referred to as "spatial-domain picture", a transformed picture is referred to as "transform-domain picture" (also referred to as "frequency-domain picture"), and the transform-domain picture can be reversely transformed into the spatial-domain picture. After the picture transform, for one thing, the features of the picture can be reflected more effectively, and for another thing, the energy can be concentrated on a small amount of data, which is more beneficial to picture storage, transmission, and processing.

In the field of video coding, after the encoder obtains the residual block, the encoder can transform the residual block. The transform method includes but is not limited to: a discrete cosine transform (DCT) and a discrete sine transform (DST). Since the DCT has a strong energy concentration characteristic, only some areas (e.g., an area at the top-left corner) of the original picture have non-zero coefficients after DCT transform. Certainly, in video coding, the picture is divided into blocks for processing, and thus the transform is performed based on blocks. The DCT that can be used in video coding includes but is not limited to DCT2 and DCT8. The DST that can be used in video coding includes but is not limited to DST7. DCT2 is a commonly used transform in video compression standards, and DCT8 and DST7 can be used in VVC. It is worth noting that transform is very useful in the ordinary video compression, but not all blocks needs to be transformed. In some cases, the compressing effect with transform is not as good as that without transform. Therefore, in some cases, the encoder can select whether transform is used for the current block.

When the encoder transforms a current block in a current picture, the encoder can use a base function or a base picture to transform the residual block of the current block. The base picture is a picture expression of the base function.

Figure 12:
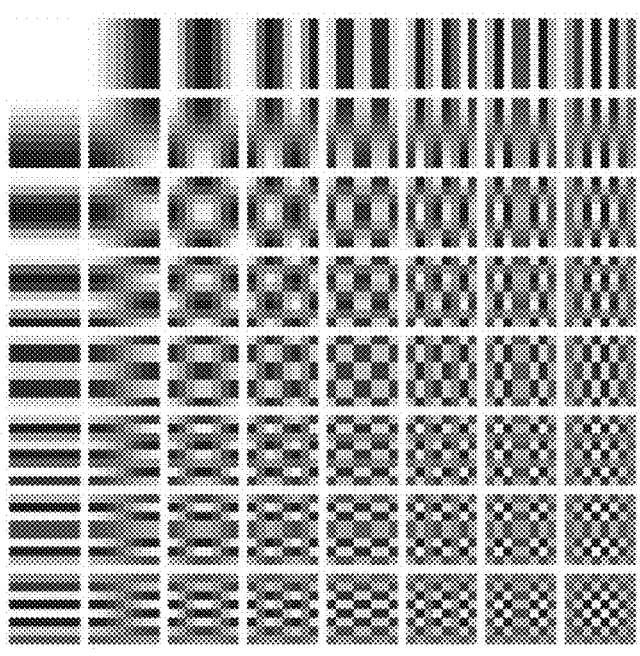
FIG. 12 is an example of a base picture of a discrete cosine transform type 2 (DCT2) provided in embodiments of the present disclosure.

FIG. 12 is an example of a base picture of DCT2 provided in embodiments of the present disclosure.

As illustrated in FIG. 12, the base picture of DCT2 can be a base picture formed by 8×8 small blocks drawn according to the base function, where each small block is formed by 8×8 elements (sub-blocks). In a specific implementation, the base picture formed by 8×8 small blocks can be used for transforming a block of size 8×8, and then an 8×8 transform coefficient matrix can be obtained.

As mentioned above, in VVC, DCT2 can be used for performing a primary transform on the residual block, and DCT8 and DST7 can also be used for performing the primary transform on the residual block, which is the multiple transform selection (MTS) technology in VVC. A transform type corresponding to the base function used for the primary transform is also referred to as "transform kernel type used for the primary transform". When the encoder performs the primary transform, based on different residual distribution characteristics, selection of the most appropriate transform kernel type can improve the compression performance. The primary transform can also be referred to as "core transform". In MTS, the transform kernel type can be selected according to some syntax elements. MTS in which the transform kernel type is selected according to some syntax elements is listed below in conjunction with Table 3.

TABLE 3

| MTS_CU_flag | MTS_Hor_flag | MTS_Ver_flag | Inter or intra | |
| | | | horizontal | vertical |
| --- | --- | --- | --- | --- |
| 0 | | | DCT2 | |
| 1 | 0 | 0 | DST7 | DST7 |
| | 0 | 1 | DCT8 | DST7 |
| | 1 | 0 | DST7 | DCT8 |
| | 1 | 1 | DCT8 | DCT8 |

As illustrated in Table 3, if the value of MTS_CU_flag is 0, the transform kernel type of the primary transform in the horizontal direction and the vertical direction is DCT2. If the value of MTS_CU_flag is 1, the value of MTS_Hor_flag is 0, and the value of MTS_Ver_flag is 0, the transform kernel type in the horizontal direction is DST7, and the transform kernel type in the vertical direction is DST7.

In the VVC standard, the syntax of MTS can also be rewritten or simplified. That is, in VVC, one syntax element mts_idx can be used for determining the transform kernel type of the primary transform.

TABLE 4

| mts_idx | 0 | 1 | 2 | 3 | 4 |
| --- | --- | --- | --- | --- | --- |
| trTypeHor | 0 | 1 | 2 | 1 | 2 |
| trTypeVer | 0 | 1 | 1 | 2 | 2 |

As illustrated in Table 4, trTypeHor indicates the transform kernel type of the horizontal transform, and trTypeVer indicates the transform kernel type of the vertical transform. Both trTypeHor and trTypeVer are 0 for DCT2 transform, 1 for DST7 transform, and 2 for DCT8 transform.

Since the distribution of residuals has a certain correlation with the intra prediction mode, this correlation can also be used for the primary transform. One method is to group the transform kernel types of MTS according to the intra prediction modes. An example of grouping is illustrated in the following table.

TABLE 5

| 0 | 0 <= mode <= 1 |
| --- | --- |
| 1 | 2 <= mode <= 12 |
| 2 | 13 <= mode <= 23 |
| 3 | 24 <= mode <= 34 |

As illustrated in Table 5, if an index of an intra prediction mode is 0 or 1, a transform kernel type set with index 0 of MTS is selected. In VVC, a mode with index 0 is Planar, and a mode with index 1 is DC. A flat prediction value will be generated for both DC and Planar. If the index of the intra prediction mode is in the range of 2 to 12, a transform kernel type set with index 1 of MTS is selected. As illustrated in the diagram of the intra prediction mode, angles from 2 to 12 all point to the bottom-left.

It can be noted that each transform kernel type set may include one transform kernel type for horizontal transform and vertical transform for selection, or may include multiple transform kernel types for horizontal transform and vertical transform for selection. That is to say, after a certain transform kernel type set is selected according to the intra prediction mode, further subdivision can be made. For example, the transform kernel type is further selected according to some flags or block-size information, which is not repeated herein. It is of great importance that the transform kernel type set can be selected for the primary transform according to the intra prediction mode. As can be seen, this method for selecting the transform kernel type set for the primary transform according to the intra prediction mode may be expanded to a more detailed grouping for the primary transform in the future, which is not limited in the present disclosure.

In addition, in the present disclosure, the transform kernel type involved in the core transform can also be referred to as "transform matrix", "transform type", "transform kernel", or other terms with similar or identical meanings. The transform kernel type set involved in the core transform can also be referred to as "transform matrix set", "transform type set", "transform kernel set", or other terms with similar or identical meanings, which are not limited in the present disclosure. In other words, in the present disclosure, selection of the transform kernel type or the transform kernel type set can also be referred to as "selection of the transform matrix or the transform matrix set", "selection of the transform type or the transform type set", and "selection of the transform kernel or the transform kernel set". The transform kernel type or the transform type can include DCT2, DCT8, DST7, etc., and can also include DCT5, DST4, DST1, identity transform (IDTR), etc.

In addition, transform kernel types of corresponding sizes can be used for blocks of different sizes, which is not repeated herein.

It is worth noting that since pictures are all two-dimensional, the amount of computation and memory overhead of directly performing a two-dimensional transform is unbearable to the hardware conditions. Therefore, DCT2, DCT8, and DST7 each are divided into one-dimensional transforms in the horizontal direction and the vertical direction, that is, they are performed in two steps. For example, a horizontal transform is performed first and then a vertical transform is performed, or the vertical transform is performed first and then the horizontal transform is performed. This transform method is more effective for horizontal and vertical textures but less effective for oblique textures. Since the horizontal and vertical textures are the most common, the transform method is very useful for improving the compression efficiency. However, with the development of technology, only processing residuals of the horizontal and vertical textures can no longer meet the demand for the compression efficiency.

Based on this, a concept of secondary transform is introduced in the present disclosure. In other words, the encoder can perform the secondary transform on the basis of the primary transform, thereby improving the compression efficiency.

Exemplarily, the core transform can be used for processing the horizontal and vertical textures. The core transform can also be referred to as "primary transform". For example, the core transform includes but is not limited to: DCT2, DCT8, and DST7. The secondary transform is used for processing the oblique textures. For example, the secondary transform includes but is not limited to: a low frequency non-separable transform (LFNST). At the encoding end, the secondary transform is performed after the core transform and before quantization. At the decoding end, the secondary transform is performed after inverse quantization and before inverse core transform.

Figure 13:
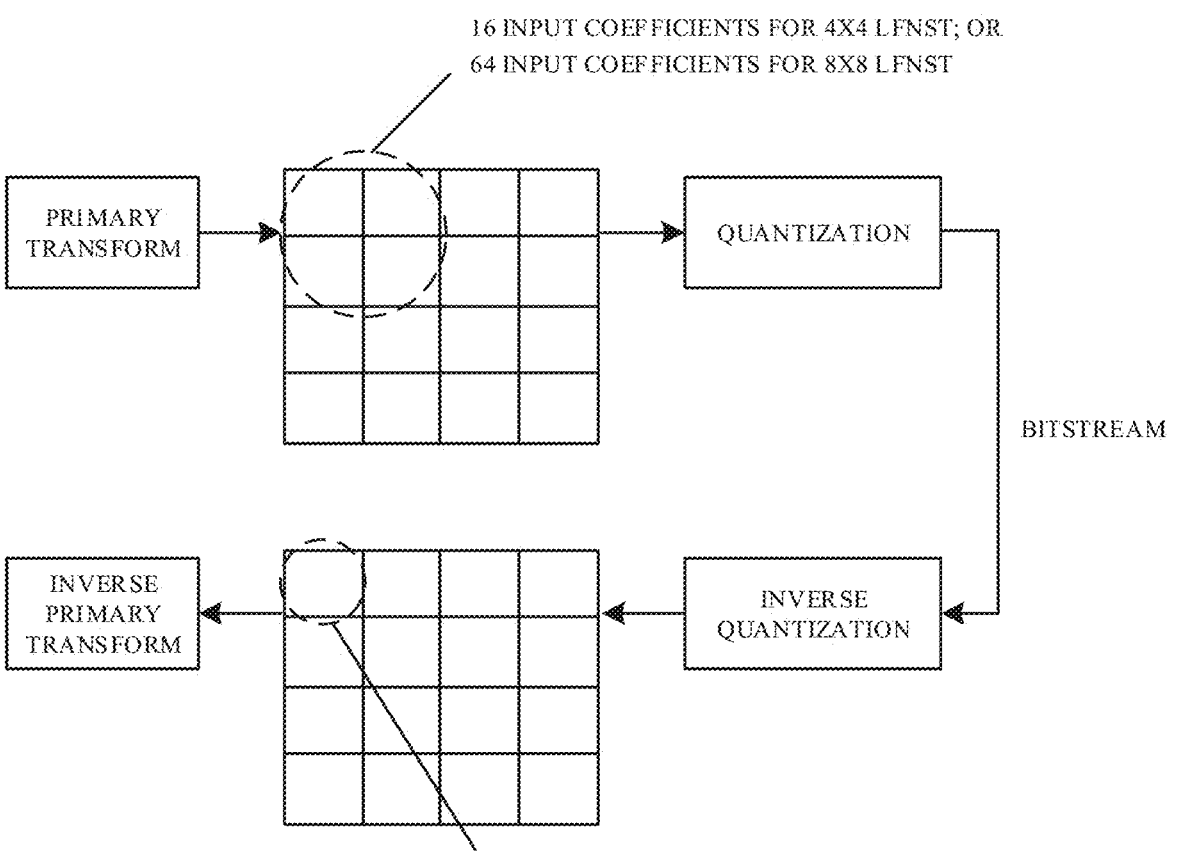
FIG. 13 is an example of a low frequency non-separable transform (LFNST) provided in embodiments of the present disclosure.

FIG. 13 is an example of an LFNST provided in embodiments of the present disclosure.

As illustrated in FIG. 13, at the encoding end, in the LFNST, the secondary transform is performed on low-frequency coefficients in the top-left corner after the primary transform. The core transform concentrates the energy in the top-left corner by de-correlating the picture, and the secondary transform further de-correlates the low-frequency coefficients after the core transform. At the encoding end, when 16 coefficients are input to a 4×4 LFNST, 8 coefficients are output, and when 64 coefficients are input to an 8×8 LFNST, 16 coefficients are output. At the decoding end, when 8 coefficients are input to a 4×4 inverse LFNST, 16 coefficients are output, and when 16 coefficients are input to an 8×8 inverse LFNST, 64 coefficients are output.

When the encoder performs the secondary transform on the current block in the current picture, a certain transform matrix in the selected transform matrix set can be used for transforming the residual block of the current block. For illustrative purposes, the secondary transform is the LFNST, for example. The transform matrix can refer to a matrix for transforming a certain oblique texture, and the transform matrix set can include matrixes for transforming certain similar oblique textures.

Figure 14:
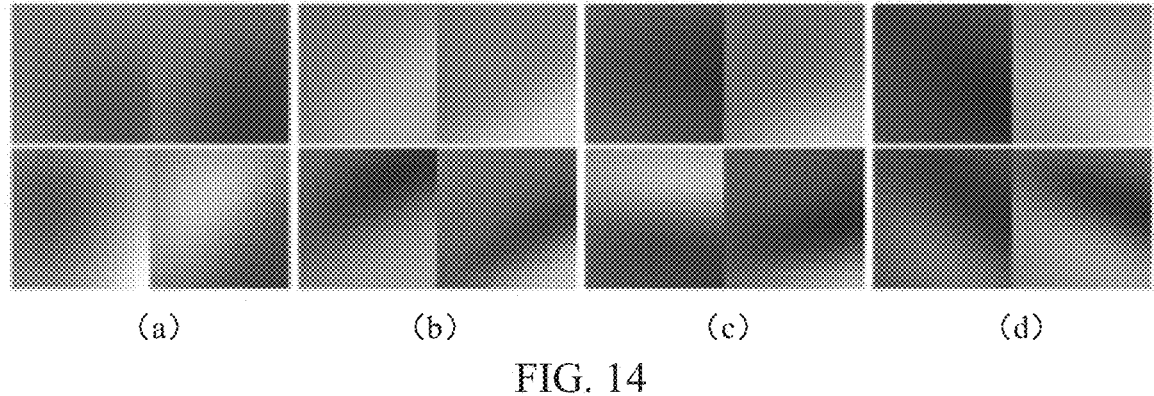
FIG. 14 is an example of a transform matrix set of an LFNST provided in embodiments of the present disclosure.

FIG. 14 is an example of a transform matrix set of an LFNST provided in embodiments of the present disclosure.

As illustrated in (a) to (d) of FIG. 14, there can be four sets of transform matrixes for the LFNST, and transform matrixes in the same set of transform matrixes have similar oblique textures. Exemplarily, a transform matrix set illustrated in (a) of FIG. 14 can be a transform matrix set with an index of 0, a transform matrix set illustrated in (b) of FIG. 14 can be a transform matrix set with an index of 1, a transform matrix set illustrated in (c) of FIG. 14 can be a transform matrix set with an index of 2, and a transform matrix set illustrated in (d) of FIG. 14 can be a transform matrix set with an index of 3.

It can be understood that the transform matrix involved in the secondary transform in the present disclosure can also be referred to as "transform kernel", "transform kernel type", "base function", or other terms with similar or identical meanings. The transform matrix set involved in the secondary transform can also be referred to as "transform kernel set", "transform kernel type set", "base function set", or other terms with similar or identical meanings, which are not limited in the present disclosure. That is to say, selection of the transform matrix or the transform matrix set involved in the present disclosure can also be referred to as "selection of the transform kernel type or the transform kernel type set", "selection of the transform type or the selection transform type set", or "selection of the transform kernel or the transform kernel set".

Related solutions of applying the LFNST to intra-coded blocks are described below.

In intra prediction, reconstructed samples around the current block are used as references for predicting the current block. Since current videos are encoded from the left to the right and from the top to the bottom, reference samples that can be used for the current block are usually on the left and the top. In angular prediction, the reference samples are spread across the current block at a specified angle as prediction values, which means that the prediction block will have obvious directional textures and the residual of the current block after angular prediction will have obvious angular characteristics statistically. Therefore, the transform matrix selected for the LFNST can be bound to the intra prediction mode. In other words, after the intra prediction mode is determined, a set of transform matrixes whose texture direction is adapted to the angular characteristics of the intra prediction mode can be used for the LFNST.

For example, it is assumed that there are four sets of transform matrixes for LFNST in total, and each set includes two transform matrixes. Table 6 illustrates a correspondence between intra prediction modes and transform matrix sets.

TABLE 6

| Intra prediction mode (IntraPredMode) | Index of transform matrix set (Tr. set index) |
|---|---|
| IntraPredMode < 0 | 1 |
| 0 <= IntraPredMode <= 1 | 0 |
| 2 <= IntraPredMode <= 12 | 1 |
| 13 <= IntraPredMode <= 23 | 2 |
| 24 <= IntraPredMode <= 44 | 3 |
| 45 <= IntraPredMode <= 55 | 2 |
| 56 <= IntraPredMode <= 80 | 1 |
| 81 <= IntraPredMode <= 83 | 0 |

As illustrated in Table 6, intra prediction modes 0 to 81 can be associated with indexes of the four sets of transform matrixes.

It is worth noting that cross-component prediction modes used for chroma intra prediction are modes 81 to 83, while there are no such modes for luma intra prediction. The transform matrix for LFNST can be transposed to handle more angles with one transform matrix set. For example, both intra prediction modes 13 to 23 and intra prediction modes 45 to 55 correspond to transform matrix set 2, but intra prediction modes 13 to 23 are obviously close to the horizontal direction, and intra prediction modes 45 to 55 are obviously close to the vertical direction. Therefore, after transform or inverse transform corresponding to intra prediction modes 45 to 55, adaption through transpose is needed.

In a specific implementation, since there are four sets of transform matrixes for LFNST in total, the encoder can determine, according to the intra prediction mode used for the current block, which set of transform matrixes is used for the LFNST, and then determine a transform matrix to-be-used among the determined set of transform matrixes. In other words, the correlation between the intra prediction mode and the transform matrix set for LFNST can be used for reducing the transmission of the selection of the transform matrix for LFNST in the bitstream. Whether LFNST is used for the current block and whether to use the first transform matrix or the second transform matrix in the transform matrix set if LFNST is used can be determined according to the bitstream and some conditions.

Certainly, considering that there are 67 common intra prediction modes and there are only four sets of transform matrixes for LFNST, multiple similar angular prediction modes can only correspond to one set of transform matrixes for LFNST. This is a compromise design between performance and complexity, because each transform matrix requires storage space to save coefficients of the transform matrix. As the increasing requirement for compression efficiency and improvement of hardware capabilities, LFNST can also be designed to be more complex. For example, a larger transform matrix, more transform matrix sets, and more transform matrixes for each transform matrix set are used. For example, Table 7 illustrates another correspondence between intra prediction modes and transform matrix sets.

TABLE 7

| Intra prediction mode | −14 | −13 | −12 | −11 | −10 | −9 | −8 | −7 | −6 | −5 | −4 | −3 | −2 | −1 |
|---|---|---|---|---|---|---|---|---|---|---|---|---|---|---|
| Index of transform matrix set | 2 | 2 | 2 | 2 | 2 | 2 | 2 | 2 | 2 | 2 | 2 | 2 | 2 | 2 |
| Intra prediction mode | 0 | 1 | 2 | 3 | 4 | 5 | 6 | 7 | 8 | 9 | 10 | 11 | 12 | 13 |
| Index of transform matrix set | 0 | 1 | 2 | 3 | 4 | 5 | 6 | 7 | 8 | 9 | 10 | 11 | 12 | 13 |
| Intra prediction mode | 14 | 15 | 16 | 17 | 18 | 19 | 20 | 21 | 22 | 23 | 24 | 25 | 26 | 27 |
| Index of transform matrix set | 14 | 15 | 16 | 17 | 18 | 19 | 20 | 21 | 22 | 23 | 24 | 25 | 26 | 27 |
| Intra prediction mode | 28 | 29 | 30 | 31 | 32 | 33 | 34 | 35 | 36 | 37 | 38 | 39 | 40 | 41 |
| Index of transform matrix set | 28 | 29 | 30 | 31 | 32 | 33 | 34 | 33 | 32 | 31 | 30 | 29 | 28 | 27 |
| Intra prediction mode | 42 | 43 | 44 | 45 | 46 | 47 | 48 | 49 | 50 | 51 | 52 | 53 | 54 | 55 |
| Index of transform matrix set | 26 | 25 | 24 | 23 | 22 | 21 | 20 | 19 | 18 | 17 | 16 | 15 | 14 | 13 |
| Intra prediction mode | 56 | 57 | 58 | 59 | 60 | 61 | 62 | 63 | 64 | 65 | 66 | 67 | 68 | 69 |
| Index of transform matrix set | 12 | 11 | 10 | 9 | 8 | 7 | 6 | 5 | 4 | 3 | 2 | 2 | 2 | 2 |
| Intra prediction mode | 70 | 71 | 72 | 73 | 74 | 75 | 76 | 77 | 78 | 79 | 80 | | | |
| Index of transform matrix set | 2 | 2 | 2 | 2 | 2 | 2 | 2 | 2 | 2 | 2 | 2 | | | |

As illustrated in Table 7, 35 transform matrix sets are used, and 3 transform matrixes are used for each transform matrix set. The correspondence between the transform matrix sets and the intra prediction modes can be implemented as follows. Intra prediction modes 0 to 34 positively correspond to transform matrix sets 0 to 34. In other words, a larger number of the prediction mode leads to a larger index of the transform matrix set. Intra prediction modes 35 to 67 reversely correspond to transform matrix sets 2 to 33 due to transpose. In other words, a larger number of the prediction mode leads to a smaller index of the transform matrix set. The remaining prediction modes can uniformly correspond to a transform matrix set with an index of 2. In other words, if transpose is not considered, one intra prediction mode corresponds to one transform matrix set. Based on this design, a more adapted LFNST transform matrix can be obtained for the residual corresponding to each intra prediction mode, thereby improving the compression performance.

Certainly, one-to-one correspondence can also be achieved for the wide angular modes theoretically, but this design is less cost-effective, which is not illustrated in the present disclosure.

In addition, for LFNST, in order to adapt the MIP to the transform matrix set, the transform matrix set to which the planar mode is adapted can serve as a transform matrix set adapted to the MIP in the present disclosure.

It can be noted that LFNST is only an example of the secondary transform and cannot be construed as a limitation to the secondary transform. For example, LFNST is a non-separable secondary transform. In other alternative embodiments, a separable secondary transform can be used for improving the compression efficiency of the residual of the oblique textures.

Figure 15:
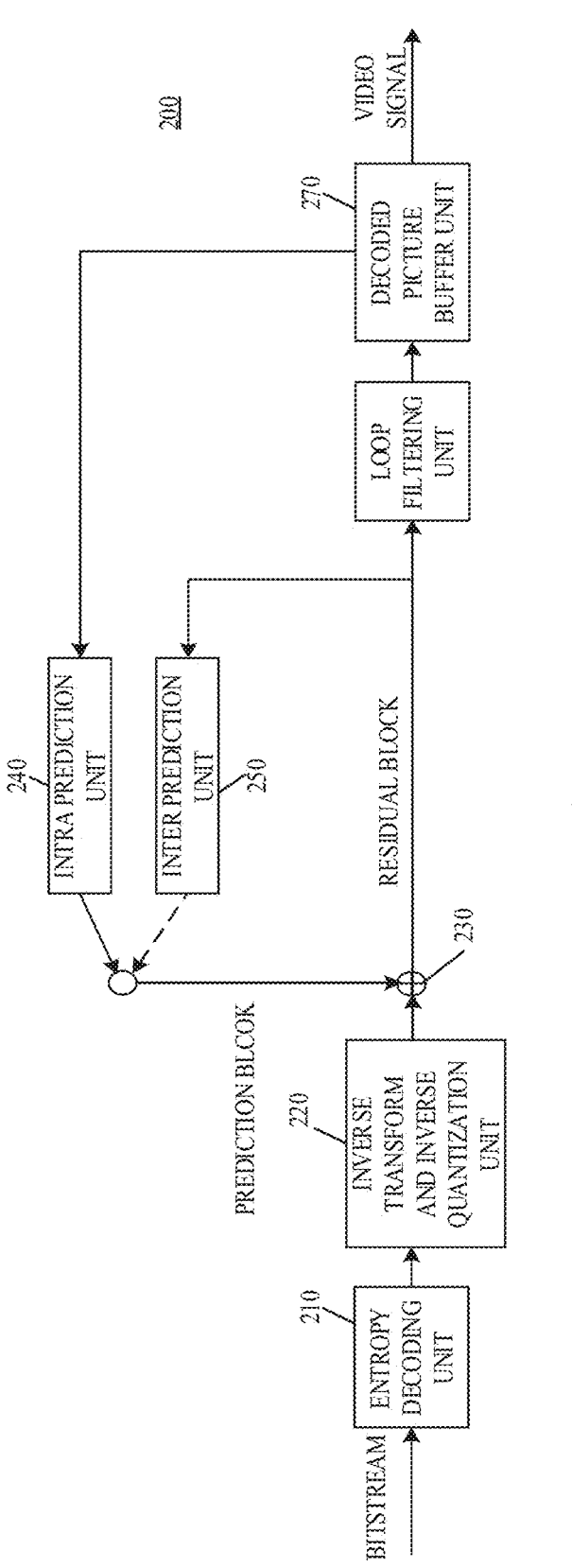
FIG. 15 is a schematic block diagram of a decoding framework provided in embodiments of the present disclosure.

FIG. 15 is a schematic block diagram of a decoding framework 200 provided in embodiments of the present disclosure.

As illustrated in FIG. 15, the decoding framework 200 can include an entropy decoding unit 210, an inverse transform and inverse quantization unit 220, a residual unit 230, an intra prediction unit 240, an inter prediction unit 250, a loop filtering unit 260, and a decoded picture buffer unit 270.

The entropy decoding unit 210 receives and parses a bitstream to obtain a prediction block and a frequency-domain residual block, and the frequency-domain residual block is inversely transformed and inversely quantized by the inverse transform and inverse quantization unit 220 to obtain a temporal residual block. The residual unit 230 superimposes a prediction block obtained by the intra prediction unit 240 or the inter prediction unit 250 to the temporal residual block obtained after performing inverse transformation and inverse quantization operations by the inverse transformation and inverse quantization unit 220, to obtain a reconstructed block.

FIG. 16 is a schematic flowchart of a decoding method 300 provided in embodiments of the present disclosure. It can be understood that the decoding method 300 can be performed by a decoder. For example, the decoding method 300 is applicable to the decoding framework 200 illustrated in FIG. 15. For ease of description, the decoder is illustrated below as an example. As illustrated in FIG. 16, the decoding method 300 can include some or all of the following.

S310, the decoder decodes a bitstream to obtain a first transform coefficient of a current block.

S320, the decoder performs a first transform on the first transform coefficient to obtain a second transform coefficient of the current block.

S330, the decoder performs a second transform on the second transform coefficient to obtain a residual block of the current block.

S340, the decoder predicts the current block based on a first prediction mode and a second prediction mode which correspond to a GPM to obtain a prediction block of the current block.

S350, the decoder obtains a reconstructed block of the current block based on the prediction block of the current block and the residual block of the current block.

In the present disclosure, the first transform is introduced on the basis of the GPM and the second transform, thereby improving the decompression efficiency of the current block.

Exemplarily, the first transform may be the LFNST. That is, in the present disclosure, the LFNST is combined with the GPM, thereby improving the compression efficiency of the residual of the oblique textures.

Certainly, a method for adapting the GPM to the LFNST is also applicable to other secondary transform methods. For example, LFNST is a non-separable secondary transform. In other alternative embodiments, the GPM may also be applicable to a separable secondary transform, which is not limited in the present disclosure.

It can be noted that the GPM can be used for intra prediction and inter prediction. In other words, prediction modes (i.e., the first prediction mode and the second prediction mode) corresponding to the GPM can be intra prediction modes, can be inter prediction modes, and can also include both intra prediction mode and inter prediction mode. In other words, in GPM, any two prediction blocks, such as two inter prediction blocks, two intra prediction blocks, or one inter prediction block and one intra prediction block, can be combined by using a weight matrix. Even in screen content coding, a prediction block in the IBC mode or a prediction block in the palette mode can be used as one or two prediction blocks among the two prediction blocks. For ease of expression, in the present disclosure, the intra mode, the inter mode, the IBC mode, and the palette mode are collectively referred to as "prediction mode". The prediction mode can be understood as information based on which the encoder and the decoder can generate a prediction block of the current block. Exemplarily, in intra prediction, the prediction mode can be a certain intra prediction mode, such as the DC mode, the planar mode, various intra angular prediction modes, etc. Certainly, one or some auxiliary information can also be superimposed, such as a method for optimizing intra reference samples, an optimization method (such as filtering) after a preliminary prediction block is generated, etc. Exemplarily, in inter prediction, the prediction mode can be the merge mode, the MMVD mode, or the AMVP mode. Exemplarily, the prediction mode can be unidirectional prediction, bidirectional prediction, or multi-hypothesis prediction. Further, if the unidirectional prediction is used for the inter prediction mode and one motion information can be determined, the prediction block can be determined based on the motion information. If the bidirectional prediction is used for the inter prediction mode and two motion information can be determined, the prediction block can be determined based on the motion information.

Certainly, the solutions provided in the present disclosure are also applicable to any prediction mode, such as AWP, that weighted prediction is performed based on multiple prediction modes, which is not limited in the present disclosure.

In some embodiments, operations at S320 can include the following. The bitstream is decoded to obtain a first flag and a second flag. When the first flag indicates that the GPM is allowed to be used for predicting a block in a current sequence and the second flag indicates that the first transform is allowed to be used for transforming the block in the current sequence, the first transform is performed on the first transform coefficient to obtain the second transform coefficient.

Exemplarily, the current sequence is a picture sequence including the current block.

Exemplarily, the first flag can be used for controlling whether the GPM is used for the current sequence.

Exemplarily, if the value of the first flag is a first value, the flag indicates that the GPM is allowed to be used for predicting the block in the current sequence. If the value of the first flag is a second value, the flag indicates that the GPM is not allowed to be used for predicting the block in the current sequence. As an implementation, the first value is 0, and the second value is 1. As another implementation, the first value is 1, and the second value is 0. Certainly, the first value or the second value can also be other values.

Exemplarily, the second flag is used for controlling whether the first transform is used for the current sequence.

Exemplarily, if the value of the second flag is a third value, the second flag indicates that the first transform is allowed to be used for transforming the block in the current sequence. If the value of the second flag is a fourth value, the second flag indicates that the first transform is not allowed to be used for transforming the block in the current sequence. As an implementation, the third value is 0, and the fourth value is 1. As another implementation, the third value is 1, and the fourth value is 0. Certainly, the third value or the fourth value can also be other values.

Exemplarily, if the first flag is denoted as sps_gpm_enabled_flag and the second flag is denoted as sps_lfnst_enabled_flag, when both the value of sps_gpm_enabled_flag and the value of sps_lfnst_enabled_flag are 1, the first transform is performed on the first transform coefficient to obtain the second transform coefficient.

Exemplarily, if the first flag indicates that the GPM is not allowed to be used for predicting the block in the current sequence and/or the second flag indicates that the first transform is not allowed to be used for transforming the block in the current sequence, the first transform is not performed on the first transform coefficient, or the second transform can be directly performed on the first transform coefficient to obtain a residual value of the current block.

Certainly, in other alternative embodiments, the first flag and/or the second flag can also be replaced with a flag at picture level, slice level, LCU level, CTU level, CU level, PU level, or TU level, etc. Alternatively, on the basis of the first flag and the second flag, flags at picture level, slice level, LCU level, CTU level, CU level, PU level, TU level, etc., can be added regarding whether the GPM is used or whether the first transform is used, which is not limited in the present disclosure.

In some embodiments, the operations at S320 can include the following. When the first flag indicates that the GPM is allowed to be used for predicting the block in the current sequence and the second flag indicates that the first transform is allowed to be used for transforming the block in the current sequence, the bitstream is decoded to obtain a third flag. When the third flag indicates that both the GPM and the first transform are allowed to be used for the block in the current sequence, the first transform is performed on the first transform coefficient to obtain the second transform coefficient.

Exemplarily, the third flag is used for controlling whether both the GPM and the first transform can be used.

Exemplarily, if the value of the third flag is a fifth value, the third flag indicates that both the GPM and the first transform are allowed to be used for the block in the current sequence. If the value of the third flag is a sixth value, the third flag indicates that not both the GPM and the first transform are allowed to be used for the block in the current sequence. As an implementation, the fifth value is 0, and the sixth value is 1. As another implementation, the fifth value is 1, and the sixth value is 0. Certainly, the fifth value or the sixth value can also be other values.

Exemplarily, if the first flag is denoted as sps_gpm_enabled_flag, the second flag is denoted as sps_lfnst_enabled_flag, and the third flag is denoted as sps_gpm_lfnst_enabled_flag, when both the value of sps_gpm_enabled_flag and the value of sps_lfnst_enabled_flag are 1, whether the value of sps_gpm_lfnst_enabled_flag is 1 is determined, and when the value of sps_gpm_lfnst_enabled_flag is 1, the first transform is performed on the first transform coefficient to obtain the second transform coefficient.

Certainly, in other alternative embodiments, the third flag can be replaced with a flag at picture level, slice level, LCU level, CTU level, CU level, PU level, TU level, etc. Alternatively, on the basis of the third flag, flags at picture level, slice level, LCU level, CTU level, CU level, PU level, TU level, etc., can be added regarding whether the GPM is used or whether the first transform is used, which is not limited in the present disclosure.

In some embodiments, the operations at S320 can include the following. When the first flag indicates that the GPM is allowed to be used for predicting the block in the current sequence and the second flag indicates that the first transform is allowed to be used for transforming the block in the current sequence, in a case where the height and/or the width of the current block is greater than or equal to a first threshold, the first transform is performed on the first transform coefficient to obtain the second transform coefficient.

Exemplarily, if the first flag is denoted as sps_gpm_enabled_flag, the second flag is denoted as sps_lfnst_enabled_ flag, and the third flag is denoted as sps_gpm_lfnst_enabled_flag, when both the value of sps_gpm_enabled_flag and the value of sps_lfnst_enabled_ flag are 1, the decoder determines the height and/or the width of the current block, and in the case where the height and/or the width of the current block is greater than or equal to the first threshold, the first transform is performed on the first transform coefficient to obtain the second transform coefficient.

Exemplarily, the first threshold can be 4, 8, 16, 32, 64, or other values.

In some embodiments, before the operations at S330, the method 300 can further include the following. The decoder determines a transform matrix set used for the first transform.

It can be noted that in GPM, the current block is predicted in combination of two prediction modes (i.e., the first prediction mode and the second prediction mode), and prediction blocks obtained by predicting the current block in different prediction modes may have different texture characteristics. Therefore, if the GPM is selected for the current block, it means that the first prediction mode can cause the prediction block of the current block to have one texture characteristic, while the second prediction mode can cause the prediction block of the current block to have another texture characteristic. In other words, after the current block is predicted, from a statistical point of view, the residual block of the current block will also have two texture characteristics, that is to say, the residual block of the current block does not necessarily conform to a law that can be reflected by a certain prediction mode. Therefore, for the GPM, the decoder needs to determine a transform matrix set adapted to its characteristics before performing the first transform on the first transform coefficient. However, a transform matrix set used for the first transform is usually a transform matrix set defined based on a single intra prediction mode. Therefore, for the GPM, it is necessary to further improve related solutions for determining the transform matrix used for the first transform, and various implementations are exemplified below.

In some embodiments, the transform matrix set used for the first transform is the same as a transform matrix set adapted to the planar mode or the DC mode.

Exemplarily, when the decoder checks the prediction mode for the current block, if the GPM is used for the current block, the decoder classifies the GPM and the planar mode (or the DC mode) into one category, and adapts the transform matrix set used for the first transform according to the planar mode (or the DC mode). Alternatively, when the decoder checks the prediction mode for the current block, if the GPM is used for the current block, the encoder can return the planar mode (or the DC mode) as the prediction mode for the current block, so that the decoder determines a transform matrix set adapted to the planar mode (or the DC mode) as the transform matrix set used for the first transform. Alternatively, when the decoder checks the prediction mode for the current block, if the GPM is used for the current block, the decoder can consider that the transform matrix set used for the first transform for the current block can be the transform matrix set adapted to the planar mode (or the DC mode).

In this embodiment, since both the planar mode (or the DC mode) and the GPM can reflect a variety of texture characteristics, the transform matrix set adapted to the planar mode or the DC mode is determined as the transform matrix set used for the first transform. In this way, the current block can be decoded based on the GPM and the first transform, and the texture characteristics of the transform matrix set used for the first transform can be ensured to be as close as possible to the texture characteristics of the residual block of the current block, thereby improving the decompression efficiency.

Exemplarily, when both the prediction modes (i.e., the first prediction mode and the second prediction mode) corresponding to the GPM are intra prediction modes or the GPM is used for intra prediction, the decoder determines that the transform matrix set used for the first transform is the same as the transform matrix set adapted to the planar mode or the DC mode.

Exemplarily, when the decoder checks the prediction mode for the current block, if the GPM is used for the current block and both the two prediction modes corresponding to the GPM are intra prediction modes, the decoder classifies the GPM and the planar mode (or the DC mode) into one category, and adapts the transform matrix set used for the first transform according to the planar mode (or the DC mode). Alternatively, when the decoder checks the prediction mode for the current block, if the GPM is used for the current block and both the two prediction modes corresponding to the GPM are intra prediction modes, the encoder can return the planar mode (or the DC mode) as the prediction mode for the current block, so that the decoder determines the transform matrix set adapted to the planar mode (or the DC mode) as the transform matrix set used for the first transform. Alternatively, when the decoder checks the prediction mode for the current block, if the GPM is used for the current block and both the two prediction modes corresponding to the GPM are intra prediction modes, the decoder can consider that the transform matrix set used for the first transform for the current block can be the transform matrix set adapted to the planar mode (or the DC mode).

Exemplarily, when both the prediction modes (i.e., the first prediction mode and the second prediction mode) corresponding to the GPM are inter prediction modes or the GPM is used for inter prediction, the decoder determines that the transform matrix set used for the first transform is the same as the transform matrix set adapted to the planar mode or the DC mode.

Exemplarily, when the decoder checks the prediction mode for the current block, if the GPM is used for the current block and both the two prediction modes corresponding to the GPM are inter prediction modes, the decoder classifies the GPM and the planar mode (or the DC mode) into one category, and adapts the transform matrix set used for the first transform according to the planar mode (or the DC mode). Alternatively, when the decoder checks the prediction mode for the current block, if the GPM is used for the current block and both the two prediction modes corresponding to the GPM are inter prediction modes, the encoder can return the planar mode (or the DC mode) as the prediction mode for the current block, so that the decoder determines the transform matrix set adapted to the planar mode (or the DC mode) as the transform matrix set used for the first transform. Alternatively, when the decoder checks the prediction mode for the current block, if the GPM is used for the current block and both the two prediction modes corresponding to the GPM are inter prediction modes, the decoder can consider that the transform matrix set used for the first transform for the current block can be the transform matrix set adapted to the planar mode (or the DC mode).

In some embodiments, the decoder first determines a partition line formed by points where a weight of the first prediction mode and a weight of the second prediction mode are the same, determines an angle index for the partition line, and then determines the transform matrix set used for the first transform based on the angle index.

Exemplarily, when both the prediction modes (i.e., the first prediction mode and the second prediction mode) corresponding to the GPM are intra prediction modes or when the GPM is used for intra prediction, the decoder first determines the partition line formed by points where the weight of the first prediction mode and the weight of the second prediction mode are the same, determines the angle index for the partition line, and then determines the transform matrix set used for the first transform based on the angle index. For example, the decoder determines the transform matrix set adapted to the prediction modes (e.g., intra prediction modes) corresponding to the angle index as the transform matrix set used for the inverse secondary transform.

Exemplarily, when both the prediction modes (i.e., the first prediction mode and the second prediction mode) corresponding to the GPM are inter prediction modes or when the GPM is used for inter prediction, the decoder first determines the partition line formed by points where the weight of the first prediction mode and the weight of the second prediction mode are the same, determines the angle index for the partition line, and then determines the transform matrix set used for the first transform based on the angle index. For example, the decoder determines the transform matrix set adapted to the prediction modes (e.g., intra prediction modes) corresponding to the angle index as the transform matrix set used for the inverse secondary transform.

Exemplarily, if the GPM is used for the current block for prediction, when the decoder selects the transform matrix set used for the first transform, the decoder can classify the GPM and an intra prediction mode corresponding to the partition line into one category based on the partition line of the GPM, that is, the decoder determines the transform matrix set used for the first transform based on the angle index. Specifically, the angle index (angleIdx) for the partition line is determined based on a weight derivation mode used for the GPM, and then a transform matrix set adapted to an intra prediction mode corresponding to the angle index is determined as the transform matrix set used for the first transform. Alternatively, when the decoder checks the prediction mode for the current block, if the GPM is used for the current block, the encoder can return the intra prediction mode corresponding to the partition line as the prediction mode for the current block, so that the decoder determines a transform matrix set adapted to the intra prediction mode corresponding to the partition line as the transform matrix set used for the first transform. Alternatively, when the decoder checks the prediction mode for the current block, if the GPM is used for the current block, the decoder can consider that the transform matrix set used for the first transform for the current block can be the transform matrix set adapted to the intra prediction mode corresponding to the partition line.

In this embodiment, since the partition line or the angle index can reflect the characteristics of the GPM and the texture characteristics of the residual block of the current block to a certain extent, by associating the angle index with the intra prediction mode, the current block can be decoded based on the GPM and the first transform, and the texture characteristics of the transform matrix set used for the first transform can be ensured to be as close as possible to the texture characteristics of the residual block of the current block, thereby improving the decompression efficiency.

It can be understood that the partition line can be for the weight derivation mode, the weight matrix, or the weight-matrix derivation mode. For the specific contents, reference can be made to the descriptions of FIG. 8 or FIG. 9 and related contents, which are not repeated herein for simplicity.

Exemplarily, the decoder can determine the transform matrix set used for the first transform based on a first mapping and the angle index. The first mapping includes a correspondence between at least one index and at least one intra prediction mode, where the at least one index includes the angle index. Certainly, the first mapping can be implemented in the form of a table or in other forms, such as an array, which is not limited in the present disclosure.

Exemplarily, the first mapping can be implemented as a table illustrated in Table 8 below.

TABLE 8

| Index | 0 | 1 | 2 | 3 | 4 | 5 | 6 | 7 |
|---|---|---|---|---|---|---|---|---|
| Intra prediction mode | 50 | 0 | 44 | 41 | 34 | 27 | 0 | 0 |
| Index | 8 | 9 | 10 | 11 | 12 | 13 | 14 | 15 |
| Intra prediction mode | 18 | 0 | 0 | 9 | 66 | 59 | 56 | 0 |
| Index | 16 | 17 | 18 | 19 | 20 | 21 | 22 | 23 |
| Intra prediction mode | 50 | 0 | 44 | 41 | 34 | 27 | 0 | 0 |
| Index | 24 | 25 | 26 | 27 | 28 | 29 | 30 | 31 |
| Intra prediction mode | 18 | 0 | 0 | 9 | 66 | 59 | 56 | 0 |

As illustrated in Table 8, the first mapping can include 32 indexes and an intra prediction mode corresponding to each index.

It can be noted that in Table 8, the index can include angleIdx illustrated in Table 1. Certainly, the index can also include indexes other than angleIdx illustrated in Table 1.

For example, some indexes correspond to 0, this is because these indexes are not used for the GPM, that is, these indexes are not involved in Table 1. It can be noted that if some indexes change in a certain version, for example, more indexes are used in the future, or if the intra angular prediction modes change, for example, more intra prediction modes occur in the future, a correspondence table illustrated in Table 8 can also be changed accordingly, which is not limited in the present disclosure.

It can be noted that, in embodiments of the present disclosure, the decoder can determine the transform matrix set used for the first transform only based on the angle index for the partition line, but in other alternative embodiments, the decoder can determine the transform matrix set used for the first transform only based on a distance index for the partition line. For example, the decoder can determine a transform matrix set adapted to a prediction mode (for example, intra prediction mode) corresponding to the distance index for the partition line as the transform matrix set used for the first transform. Alternatively, the decoder can also determine the transform matrix set used for the first transform based on the partition line (that is, the angle index for the partition line and the distance index for the partition line). For example, the decoder can determine a transform matrix set adapted to a prediction mode (for example, intra prediction mode) corresponding to the partition line (that is, the angle index for the partition line and the distance index for the partition line) as the transform matrix set used for the first transform, which is not limited in the present disclosure.

In some embodiments, the decoder first determines a weight derivation mode used for the GPM, and then determines a transform matrix set adapted to an intra prediction mode corresponding to the weight derivation mode as the transform matrix set used for the first transform.

Exemplarily, when both the prediction modes (i.e., the first prediction mode and the second prediction mode) corresponding to the GPM are intra prediction modes or the GPM is used for intra prediction, the decoder first determines the weight derivation mode used for the GPM, and then determines the transform matrix set adapted to the intra prediction mode corresponding to the weight derivation mode as the transform matrix set used for the first transform.

Exemplarily, when both the prediction modes (i.e., the first prediction mode and the second prediction mode) corresponding to the GPM are inter prediction modes or the GPM is used for inter prediction, the decoder first determines the weight derivation mode used for the GPM, and then determines the transform matrix set adapted to the intra prediction mode corresponding to the weight derivation mode as the transform matrix set used for the first transform.

Exemplarily, when the decoder checks the prediction mode for the current block, if the GPM is used for the current block, the decoder classifies the intra prediction modes corresponding to the GPM and the weight derivation mode into one category, and adapts the transform matrix set used for the first transform according to the intra prediction mode corresponding to the weight derivation mode. Alternatively, when the decoder checks the prediction mode for the current block, if the GPM is used for the current block, the encoder can return the intra prediction mode corresponding to the weight derivation mode as the prediction mode for the current block, so that the decoder determines a transform matrix set adapted to the intra prediction mode corresponding to the weight derivation mode as the transform matrix set used for the first transform. Alternatively, when the decoder checks the prediction mode for the current block, if the GPM is used for the current block, the decoder can consider that the transform matrix set used for the first transform for the current block can be the transform matrix set adapted to the intra prediction mode corresponding to the weight derivation mode.

In this embodiment, since the weight derivation mode can reflect the characteristics of the GPM and the texture characteristics of the residual block of the current block to a certain extent, by associating the weight derivation mode with the intra prediction mode, the current block can be decoded based on the GPM and the first transform, and the texture characteristics of the transform matrix set used for the first transform can be ensured to be as close as possible to the texture characteristics of the residual block of the current block, thereby improving the decompression efficiency.

Exemplarily, the decoder can determine, based on a second mapping, the transform matrix set adapted to the intra prediction mode corresponding to the weight derivation mode used for the GPM as the transform matrix set used for the first transform. The second mapping includes a correspondence between at least one weight derivation mode and at least one intra prediction mode, where the at least one weight derivation mode includes the weight derivation mode used for the GPM.

Certainly, the second mapping can be implemented in the form of a table or other forms, such as an array, which is not limited in the present disclosure.

It can be understood that the weight derivation mode can also be referred to as "weight matrix" or "weight-matrix derivation mode". For the specific contents, reference can be made to the descriptions of FIG. 8, Table 1, and related contents, which are not repeated herein for simplicity.

In some embodiments, the first prediction mode is a first intra prediction mode, and the second prediction mode is a second intra prediction mode. The decoder determines a third intra prediction mode based on the first intra prediction mode and the second intra prediction mode, where the transform matrix set used for the first transform is the same as a transform matrix set adapted to the third intra prediction mode.

Exemplarily, the decoder can determine the transform matrix set adapted to the third intra prediction mode as the transform matrix set used for the first transform.

Exemplarily, when the decoder checks the prediction mode for the current block, if the GPM is used for the current block, the decoder can determine the third intra prediction mode based on the first intra prediction mode and the second intra prediction mode, and classify the GPM and the third intra prediction mode into one category, so that the decoder can adapt, according to the third intra prediction mode, the transform matrix set used for the first transform. Alternatively, when the decoder checks the prediction mode for the current block, if the GPM is used for the current block, the encoder can return the third intra prediction mode as the prediction mode for the current block, so that the decoder determines a transform matrix set adapted to the third intra prediction mode as the transform matrix set used for the first transform. Alternatively, when the decoder checks the prediction mode for the current block, if the GPM is used for the current block, the decoder can consider the transform matrix set used for the first transform for the current block as the transform matrix set adapted to the third intra prediction mode.

Certainly, in other alternative embodiments, the decoder may not explicitly determine the third intra prediction mode first and then determine the transform matrix set used for the first transform based on the third intra prediction mode.

Instead, the decoder directly determines the transform matrix set adapted to the third intra prediction mode as the transform matrix set used for the first transform.

In some embodiments, the decoder determines a default prediction mode among the first intra prediction mode and the second intra prediction mode as the third intra prediction mode. Alternatively, the decoder determines an intra prediction mode corresponding to a weight derivation mode used for the GPM among the first intra prediction mode and the second intra prediction mode as the third intra prediction mode. Alternatively, the decoder determines the third intra prediction mode based on a weight of the first intra prediction mode and/or a weight of the second intra prediction mode. Alternatively, the decoder determines the third intra prediction mode based on a type of the first intra prediction mode and a type of the second intra prediction mode. Alternatively, the decoder determines the third intra prediction mode based on a prediction angle of the first intra prediction mode and a prediction angle of the second intra prediction mode.

Exemplarily, when the decoder checks the prediction mode for the current block, if the GPM is used for the current block, during the selection of the transform matrix set used for the first transform, the transform matrix set used for the first transform can be determined based on the first intra prediction mode and the second intra prediction mode. As an implementation, the first intra prediction mode can be used for determination in any case, that is, a transform matrix set adapted to the first intra prediction mode is determined as the transform matrix set used for the first transform in any case. Alternatively, the second intra prediction mode can be used for determination in any case, that is, a transform matrix set adapted to the second intra prediction mode is determined as the transform matrix set used for the first transform in any case. As another implementation, the first intra prediction mode can be used for determination in some cases, that is, the transform matrix set adapted to the first intra prediction mode is determined as the transform matrix set used for the first transform in some cases. Alternatively, the second intra prediction mode can be used for determination in some cases, that is, the transform matrix set adapted to the second intra prediction mode is determined as the transform matrix set used for the first transform in some cases. Even the planar mode or the DC mode can be used for determination in some cases, that is, the transform matrix set adapted to the planar mode or the DC mode is determined as the transform matrix set used for the first transform in some cases. A certain prediction mode is used for determination, that is, the GPM and the certain prediction mode are classified into one category, so that the decoder can adapt the transform matrix set used for the first transform according to the certain prediction mode. Alternatively, when the decoder checks the prediction mode for the current block, if the GPM is used for the current block, the certain prediction mode can be returned, so that the decoder can adapt the transform matrix set used for the first transform according to the certain prediction mode. Alternatively, when the decoder checks the prediction mode for the current block, if the GPM is used for the current block, the decoder can consider that the transform matrix set used for the first transform for the current block can be a transform matrix set adapted to the certain prediction mode.

Exemplarily, when the decoder determines the intra prediction mode corresponding to the weight derivation mode used for the GPM among the first intra prediction mode and the second intra prediction mode as the third intra prediction mode, the decoder can determine, based on a third mapping, the intra prediction mode corresponding to the weight derivation mode used for the GPM as the third intra prediction mode.

The third mapping includes a weight derivation mode corresponding to the first intra prediction mode and a weight derivation mode corresponding to the second intra prediction mode, where the weight derivation mode corresponding to the first intra prediction mode includes the weight derivation mode used for the GPM or the weight derivation mode corresponding to the second intra prediction mode includes the weight derivation mode used for the GPM. Alternatively, based on the third mapping, when the weight derivation mode corresponding to the first intra prediction mode includes the weight derivation mode used for the GPM, the first intra prediction mode is determined as the third intra prediction mode, and when the weight derivation mode corresponding to the second intra prediction mode includes the weight derivation mode used for the GPM, the second intra prediction mode is determined as the third intra prediction mode. Alternatively, the third mapping can be used for specifying a weight derivation mode corresponding to the first prediction mode and a weight derivation mode corresponding to the second prediction mode. In a specific implementation, the third mapping can only include the weight derivation mode corresponding to the first intra prediction mode and the weight derivation mode corresponding to the second intra prediction mode. In another specific implementation, the third mapping can also include weight derivation modes corresponding to intra prediction modes other than the first intra prediction mode and the second intra prediction mode.

Certainly, the third mapping can be implemented in the form of a table or other forms, such as an array, which is not limited in the present disclosure.

In some embodiments, the decoder can determine the third intra prediction mode based on a weight of the first intra prediction mode at a default position or a weight of the second intra prediction mode at the default position.

Exemplarily, the third intra prediction mode is related to the weight of the first intra prediction mode at the default position or the weight of the second intra prediction mode at the default position.

Exemplarily, the weight of the first intra prediction mode at the default position can be a weight used when the first intra prediction mode is used for predicting points of the current block at the default position. Similarly, the weight of the second intra prediction mode at the default position can be a weight used when the second intra prediction mode is used for predicting points of the current block at the default position. For example, in combination with the contents related to the GPM above, the weight of the first intra prediction mode at the default position can be wValue calculated at the default position, and the weight of the second intra prediction mode at the default position can be 8-wValue calculated at the default position.

In some embodiments, when the decoder determines the third intra prediction mode based on the weight of the first intra prediction mode and/or the weight of the second intra prediction mode, the decoder can determine an intra prediction mode with a maximum weight at the default position among the first intra prediction mode and the second intra prediction mode as the third intra prediction mode.

Exemplarily, if the weight of the first intra prediction mode at the default position is greater than the weight of the second intra prediction mode at the default position, the decoder can determine the first intra prediction mode as the third intra prediction mode, or directly determine the transform matrix set adapted to the first intra prediction mode as the transform matrix set used for the first transform. If the weight of the second intra prediction mode at the default position is greater than the weight of the first intra prediction mode at the default position, the decoder can determine the second intra prediction mode as the third intra prediction mode, or directly determine the transform matrix set adapted to the second intra prediction mode as the transform matrix set used for the first transform.

Certainly, in other alternative embodiments, the third intra prediction mode can also be determined only based on the weight of the first intra prediction mode or the weight of the second intra prediction mode. For example, if the weight of the first intra prediction mode is greater than a threshold, the first intra prediction mode can be determined as the third intra prediction mode, otherwise, the second intra prediction mode can be determined as the third intra prediction mode. For example, if the weight of the second intra prediction mode is greater than a threshold, the second intra prediction mode can be determined as the third intra prediction mode, otherwise, the first intra prediction mode can be determined as the third intra prediction mode.

Certainly, in other alternative embodiments, the weight of the first intra prediction mode can be a weight calculated based on the weight matrix used for the GPM for the first intra prediction. Similarly, the weight of the second intra prediction mode can be a weight calculated based on the weight matrix used for the GPM for the second intra prediction mode. In other words, the decoder can first calculate a weight value of each point, calculate weight values of all points for the first intra prediction mode and/or the second intra prediction mode, respectively, and then determine the third intra prediction mode based on the weight of the first intra prediction mode and/or the weight of the second intra prediction mode. As an implementation, if the weight of the first intra prediction mode is greater than a threshold, the first intra prediction mode can be determined as the third intra prediction mode, otherwise, the second intra prediction mode can be determined as the third intra prediction mode. As another implementation, an intra prediction mode with a maximum weight among the first intra prediction mode and the second intra prediction mode can be determined as the third intra prediction mode.

In some embodiments, the default position is a center position.

Certainly, in other alternative embodiments, the default position can be other positions, such as a top-left position, a top-right position, a bottom-left position, a bottom-right position, etc.

In some embodiments, when the decoder determines the third intra prediction mode based on the weight of the first intra prediction mode at the default position or the weight of the second intra prediction mode at the default position, the decoder can also first determine a partition line formed by points where the weight of the first prediction mode and the weight of the second prediction mode are the same, and then determine the third intra prediction mode based on the partition line. For example, the decoder can determine the third intra prediction mode based on the angle index for the partition line and/or the distance index for the partition line.

Exemplarily, when the decoder determines an intra prediction mode corresponding to the angle index for the partition line among the first intra prediction mode and the second intra prediction mode as the third intra prediction mode, the decoder can determine, based on a fourth mapping, the intra prediction mode corresponding to the angle index for the partition line as the third intra prediction mode.

The fourth mapping includes an angle index corresponding to the first intra prediction mode and an angle index corresponding to the second intra prediction mode, where the angle index corresponding to the first intra prediction mode includes the angle index for the partition line or the angle index corresponding to the second intra prediction mode includes the angle index for the partition line. Alternatively, based on the fourth mapping, when the angle index corresponding to the first intra prediction mode includes the angle index for the partition line, the first intra prediction mode is determined as the third intra prediction mode, and when the angle index corresponding to the second intra prediction mode includes the angle index for the partition line, the second intra prediction mode is determined as the third intra prediction mode. Alternatively, the fourth mapping can be used for specifying an angle index corresponding to the first prediction mode and an angle index corresponding to the second prediction mode. In a specific implementation, the fourth mapping can only include the angle index corresponding to the first intra prediction mode and the angle index corresponding to the second intra prediction mode. In another specific implementation, the fourth mapping can also include angle indexes corresponding to intra prediction modes other than the first intra prediction mode and the second intra prediction mode.

Certainly, the fourth mapping can be implemented in the form of a table or other forms, such as an array, which is not limited in the present disclosure.

Exemplarily, when the decoder determines an intra prediction mode corresponding to the distance index for the partition line among the first intra prediction mode and the second intra prediction mode as the third intra prediction mode, the decoder can determine the intra prediction mode corresponding to the distance index for the partition line as the third intra prediction mode based on the fifth mapping.

The fifth mapping includes a distance index corresponding to the first intra prediction mode and a distance index corresponding to the second intra prediction mode, where the distance index corresponding to the first intra prediction mode includes the distance index for the partition line or the distance index corresponding to the second intra prediction mode includes the distance index for the partition line. Alternatively, based on the fifth mapping, when the distance index corresponding to the first intra prediction mode includes the distance index for the partition line, the first intra prediction mode is determined as the third intra prediction mode, and when the distance index corresponding to the second intra prediction mode includes the distance index for the partition line, the second intra prediction mode is determined as the third intra prediction mode. Alternatively, the fifth mapping can be used for specifying a distance index corresponding to the first prediction mode and a distance index corresponding to the second prediction mode. In a specific implementation, the fifth mapping can only include the distance index corresponding to the first intra prediction mode and the distance index corresponding to the second intra prediction mode. In another specific implementation, the fifth mapping can also include distance indexes corresponding to intra prediction modes other than the first intra prediction mode and the second intra prediction mode.

Certainly, the fifth mapping can be implemented in the form of a table or other forms, such as an array, which is not limited in the present disclosure.

In some embodiments, when the decoder determines the third intra prediction mode based on the type of the first intra prediction mode and the type of the second intra prediction mode, if the first intra prediction mode and the second intra prediction mode include an angular prediction mode and a non-angular prediction mode, the angular prediction mode is determined as the third intra prediction mode.

Exemplarily, when the decoder determines the third intra prediction mode based on the type of the first intra prediction mode and the type of the second intra prediction mode, the priority of the angular prediction mode as the third intra prediction mode is higher than the priority of the non-angular prediction mode as the third intra prediction mode. For example, if the first intra prediction mode is the angular prediction mode and the second intra prediction mode is the non-angular prediction mode (e.g., the planar mode or the DC mode), the first intra prediction mode (i.e., the angular prediction mode) is determined as the third intra prediction mode.

In some embodiments, when the decoder determines the third intra prediction mode based on the prediction angle of the first intra prediction mode and the prediction angle of the second intra prediction mode, if the prediction angle of the first intra prediction mode is close to the prediction angle of the second intra prediction mode, the decoder can determine the first intra prediction mode, the second intra prediction mode, or an intra prediction mode whose prediction angle is between the prediction angle of the first intra prediction mode and the prediction angle of the second intra prediction mode as the third intra prediction mode. If the prediction angle of the first intra prediction mode is significantly different from the prediction angle of the second intra prediction mode, the decoder can determine the planar mode or the DC mode as the third intra prediction mode.

In some embodiments, when an absolute value of a difference between the prediction angle of the first intra prediction mode and the prediction angle of the second intra prediction mode is less than or equal to a second threshold, an intra prediction mode corresponding to a first prediction angle is determined as the third intra prediction mode, where the first prediction angle is determined according to the prediction angle of the first intra prediction mode and the prediction angle of the second intra prediction mode. When the absolute value of the difference between the prediction angle of the first intra prediction mode and the prediction angle of the second intra prediction mode is greater than the second threshold, the planar mode or the DC mode is determined as the third intra prediction mode.

In some embodiments, the decoder determines the transform matrix set adapted to the GPM as the transform matrix set used for the first transform.

Exemplarily, when both the prediction modes (i.e., the first prediction mode and the second prediction mode) corresponding to the GPM are intra prediction modes or when the GPM is used for intra prediction, the decoder determines the transform matrix set adapted to the GPM as the transform matrix set used for the first transform.

Exemplarily, when both the prediction modes (i.e., the first prediction mode and the second prediction mode) corresponding to the GPM are inter prediction modes or when the GPM is used for inter prediction, the decoder determines the transform matrix set adapted to the GPM as the transform matrix set used for the first transform.

For example, the decoder can define an adapted or dedicated transform matrix set for the GPM.

In some embodiments, the first transform is used for processing textures of the current block in an oblique direction, and the second transform is used for processing textures of the current block in a horizontal direction and textures of the current block in a vertical direction.

The decoding method of embodiments of the present disclosure has been described in detail above from the perspective of the decoder, and an encoding method of embodiments of the present disclosure will be described below from the perspective of the encoder in connection with FIG. 17.

Figure 17:
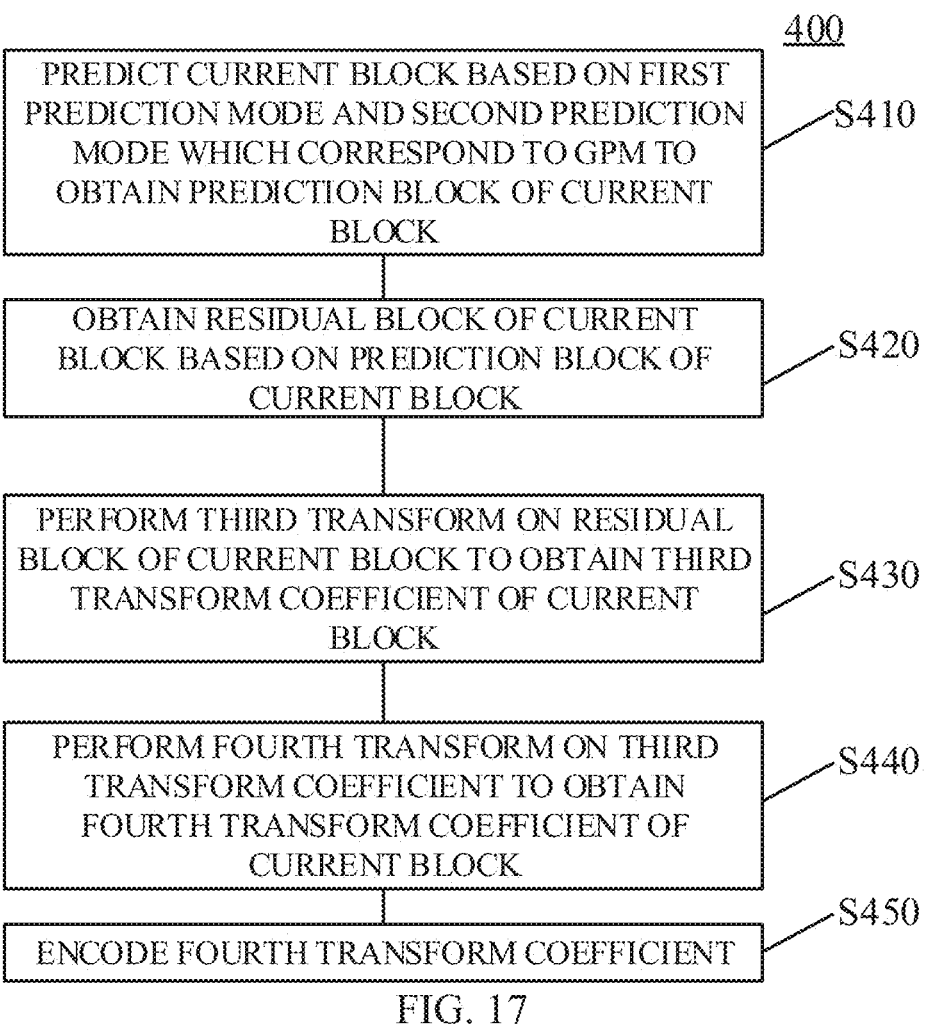
FIG. 17 is a schematic flowchart of an encoding method provided in embodiments of the present disclosure.

FIG. 17 is a schematic flowchart of an encoding method 400 provided in embodiments of the present disclosure. It can be understood that the encoding method 400 can be performed by an encoder. For example, the encoding method 400 is applicable to the encoding framework 100 illustrated in FIG. 1. For ease of description, the encoder is illustrated below as an example.

As illustrated in FIG. 17, the encoding method 400 can include the following.

S410, a current block is predicted based on a first prediction mode and a second prediction mode which correspond to a GPM to obtain a prediction block of the current block.

S420, a residual block of the current block is obtained based on the prediction block of the current block.

S430, a third transform is performed on the residual block of the current block to obtain a third transform coefficient of the current block.

S440, a fourth transform is performed on the third transform coefficient to obtain a fourth transform coefficient of the current block.

S450, the fourth transform coefficient is encoded.

It can be understood that the first transform at the decoding end is an inverse transform of the fourth transform at the encoding end, and the second transform at the decoding end is an inverse transform of the third transform at the encoding end. For example, the third transform is the primary transform or the core transform mentioned above, and the fourth transform is the secondary transform mentioned above. Correspondingly, the first transform is an inverse transform (or de-transform) of the secondary transform, and the second transform can be an inverse transform (or de-transform) of the primary transform or the core transform. For example, the first transform can be an inverse (de) LFNST, and the second transform can be an inverse (de) DCT2, an inverse (de) DCT8, an inverse (de) DST7, etc. Correspondingly, the third transform can be DCT2, DCT8, DST7, etc., and the fourth transform can be LFNST.

In some embodiments, operations at S450 can include the following. A first flag, a second flag, and the fourth transform coefficient are encoded, where the first flag indicates that the GPM is allowed to be used for predicting a block in a current sequence, and the second flag indicates that the fourth transform is allowed to be used for transforming the block in the current sequence.

In some embodiments, operations at S450 can include the following. The first flag, the second flag, the fourth transform coefficient, and a third flag are encoded, where the third flag indicates that both the GPM and the fourth transform are allowed to be used for the block in the current sequence.

In some embodiments, operations at S440 can include the following. In a case where a height and/or a width of the current block is greater than or equal to a first threshold, the fourth transform is performed on the third transform coefficient to obtain the fourth transform coefficient.

In some embodiments, before the operations at S440, the method 400 can further include the following. A transform matrix set used for the fourth transform is determined.

In some embodiments, the transform matrix set used for the fourth transform is the same as a transform matrix set adapted to a planar mode or a DC mode.

In some embodiments, the transform matrix set used for the fourth transform is determined as follows. A partition line formed by points where a weight of the first prediction mode and a weight of the second prediction mode are the same is determined. An angle index for the partition line is determined. The transform matrix set used for the fourth transform is determined based on the angle index.

In some embodiments, the transform matrix set used for the fourth transform is determined as follows. A weight derivation mode used for the GPM is determined. A transform matrix set adapted to an intra prediction mode corresponding to the weight derivation mode is determined as the transform matrix set used for the fourth transform.

In some embodiments, the first prediction mode is a first intra prediction mode, and the second prediction mode is a second intra prediction mode, and the transform matrix set used for the fourth transform is determined as follows. A third intra prediction mode is determined based on the first intra prediction mode and the second intra prediction mode, where the transform matrix set used for the fourth transform is the same as a transform matrix set adapted to the third intra prediction mode.

In some embodiments, the third intra prediction mode is determined based on the first intra prediction mode and the second intra prediction mode as follows. A default prediction mode among the first intra prediction mode and the second intra prediction mode is determined as the third intra prediction mode. Alternatively, an intra prediction mode corresponding to a weight derivation mode used for the GPM among the first intra prediction mode and the second intra prediction mode is determined as the third intra prediction mode. Alternatively, the third intra prediction mode is determined based on a weight of the first intra prediction mode and/or a weight of the second intra prediction mode. Alternatively, the third intra prediction mode is determined based on a type of the first intra prediction mode and a type of the second intra prediction mode. Alternatively, the third intra prediction mode is determined based on a prediction angle of the first intra prediction mode and a prediction angle of the second intra prediction mode.

In some embodiments, the third intra prediction mode is determined based on the weight of the first intra prediction mode and/or the weight of the second intra prediction mode as follows. The third intra prediction mode is determined based on a weight of the first intra prediction mode at a default position or a weight of the second intra prediction mode at the default position.

In some embodiments, the third intra prediction mode is determined based on the weight of the first intra prediction mode at the default position or the weight of the second intra prediction mode at the default position as follows. An intra prediction mode with a maximum weight at the default position among the first intra prediction mode and the second intra prediction mode is determined as the third intra prediction mode.

In some embodiments, the default position is a center position.

In some embodiments, the third intra prediction mode is determined based on the type of the first intra prediction mode and the type of the second intra prediction mode as follows. When the first intra prediction mode and the second intra prediction mode include an angular prediction mode and a non-angular prediction mode, the angular prediction mode is determined as the third intra prediction mode.

In some embodiments, the third intra prediction mode is determined based on the prediction angle of the first intra prediction mode and the prediction angle of the second intra prediction mode as follows. When an absolute value of a difference between the prediction angle of the first intra prediction mode and the prediction angle of the second intra prediction mode is less than or equal to a second threshold, an intra prediction mode corresponding to a first prediction angle is determined as the third intra prediction mode, where the first prediction angle is determined according to the prediction angle of the first intra prediction mode and the prediction angle of the second intra prediction mode. When the absolute value of the difference between the prediction angle of the first intra prediction mode and the prediction angle of the second intra prediction mode is greater than the second threshold, a planar mode or a DC mode is determined as the third intra prediction mode.

In some embodiments, the transform matrix set used for the fourth transform is determined as follows. A transform matrix set adapted to the GPM is determined as the transform matrix set used for the fourth transform.

In some embodiments, the fourth transform is used for processing textures of the current block in an oblique direction, and the third transform is used for processing textures of the current block in a horizontal direction and textures of the current block in a vertical direction.

It can be understood that the encoding method can be understood as an inverse process of the decoding method. Therefore, for the specific solutions of the encoding method 400, reference can be made to related contents of the decoding method 300, which is not repeated herein for simplicity.

The preferred embodiments of the present disclosure are described in detail above in conjunction with the accompanying drawings. However, the present disclosure is not limited to the specific details in the above implementations. Within the technical conception of the present disclosure, various simple variants of technical solutions of the present disclosure can be made, and these simple variants all fall within the protection scope of the present disclosure. For example, each specific technical feature described in the above implementations can be combined in any suitable way without contradiction, and to avoid unnecessary repetition, the various possible combinations are not described separately in the present disclosure. For example, various embodiments of the present disclosure can also be combined in any way, and as long as they do not contradict the idea of the present disclosure, they can also be considered as disclosed in the present disclosure. It can also be understood that in the various method embodiments of the present disclosure, the numbering of each process mentioned above does not imply the order of execution, and the order of execution of each process shall be determined by its function and inherent logic, which shall not constitute any limitation to the implementation process of the embodiments of the present disclosure.

Method embodiments of the present disclosure are described in detail above, and apparatus embodiments of the present disclosure are described in detail below in connection with FIG. 14 to FIG. 20.

Figures 18, 19:
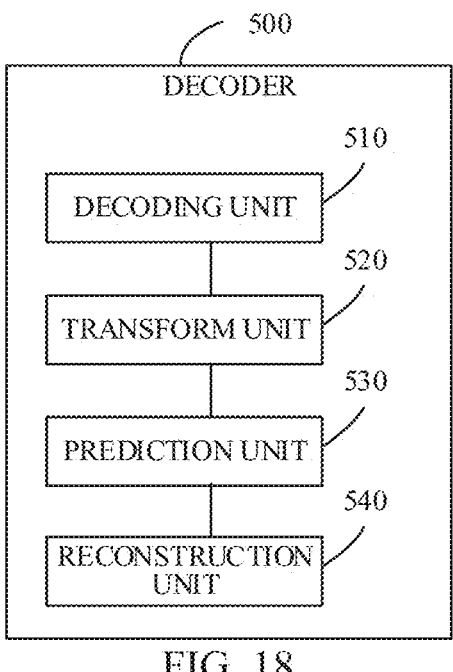
FIG. 18 is a schematic block diagram of a decoder provided in embodiments of the present disclosure.
FIG. 19 is a schematic block diagram of an encoder provided in embodiments of the present disclosure.

FIG. 18 is a schematic block diagram of a decoder 500 according to embodiments of the present disclosure.

As illustrated in FIG. 18, the decoder 500 can include a decoding unit 510, a transform unit 520, a prediction unit 530, and a reconstruction unit 540. The decoding unit 510 is configured to decode a bitstream to obtain a first transform coefficient of a current block. The transform unit 520 is configured to: perform a first transform on the first transform coefficient to obtain a second transform coefficient of the current block, and perform a second transform on the second transform coefficient to obtain a residual block of the current block. The prediction unit 530 is configured to predict the current block based on a first prediction mode and a second prediction mode which correspond to a GPM to obtain a prediction block of the current block. The reconstruction unit 540 is configured to obtain a reconstructed block of the current block based on the prediction block of the current block and the residual block of the current block.

In some embodiments, the transform unit 520 is specifically configured to decoding the bitstream to obtain a first flag and a second flag, and when the first flag indicates that the GPM is allowed to be used for predicting a block in a current sequence and the second flag indicates that the first transform is allowed to be used for transforming the block in the current sequence, perform the first transform on the first transform coefficient to obtain the second transform coefficient.

In some embodiments, the transform unit 520 is specifically configured to, when the first flag indicates that the GPM is allowed to be used for predicting the block in the current sequence and the second flag indicates that the first transform is allowed to be used for transforming the block in the current sequence, decode the bitstream to obtain a third flag, and when the third flag indicates that both the GPM and the first transform are allowed to be used for the block in the current sequence, perform the first transform on the first transform coefficient to obtain the second transform coefficient.

In some embodiments, the transform unit 520 is specifically configured to, when the first flag indicates that the GPM is allowed to be used for predicting the block in the current sequence and the second flag indicates that the first transform is allowed to be used for transforming the block in the current sequence, in a case where a height and/or a width of the current block is greater than or equal to a first threshold, perform the first transform on the first transform coefficient to obtain the second transform coefficient.

In some embodiments, before performing the second transform on the second transform coefficient to obtain the residual block of the current block, the transform unit 520 is further configured to determine a transform matrix set used for the first transform.

In some embodiments, the transform matrix set used for the first transform is the same as a transform matrix set adapted to a planar mode or a DC mode.

In some embodiments, the transform unit 520 is specifically configured to determine a partition line formed by points where a weight of the first prediction mode and a weight of the second prediction mode are the same, determine an angle index for the partition line, and determine the transform matrix set used for the first transform based on the angle index.

In some embodiments, the transform unit 520 is specifically configured to determine a weight derivation mode used for the GPM, and determine a transform matrix set adapted to an intra prediction mode corresponding to the weight derivation mode as the transform matrix set used for the first transform.

In some embodiments, the first prediction mode is a first intra prediction mode, and the second prediction mode is a second intra prediction mode. The transform unit 520 is specifically configured to determine a third intra prediction mode based on the first intra prediction mode and the second intra prediction mode, where the transform matrix set used for the first transform is the same as a transform matrix set adapted to the third intra prediction mode.

In some embodiments, the transform unit 520 is specifically configured to determine a default prediction mode among the first intra prediction mode and the second intra prediction mode as the third intra prediction mode, or determine an intra prediction mode corresponding to a weight derivation mode used for the GPM among the first intra prediction mode and the second intra prediction mode as the third intra prediction mode, or determine the third intra prediction mode based on a weight of the first intra prediction mode and/or a weight of the second intra prediction mode, or determine the third intra prediction mode based on a type of the first intra prediction mode and a type of the second intra prediction mode, or determine the third intra prediction mode based on a prediction angle of the first intra prediction mode and a prediction angle of the second intra prediction mode.

In some embodiments, the transform unit 520 is specifically configured to determine the third intra prediction mode based on a weight of the first intra prediction mode at a default position or a weight of the second intra prediction mode at the default position.

In some embodiments, the transform unit 520 is specifically configured to determine an intra prediction mode with a maximum weight at the default position among the first intra prediction mode and the second intra prediction mode as the third intra prediction mode. In some embodiments, the default position is a center position.

In some embodiments, the transform unit 520 is specifically configured to, when the first intra prediction mode and the second intra prediction mode include an angular prediction mode and a non-angular prediction mode, determine the angular prediction mode as the third intra prediction mode.

In some embodiments, the transform unit 520 is specifically configured to, when an absolute value of a difference between the prediction angle of the first intra prediction mode and the prediction angle of the second intra prediction mode is less than or equal to a second threshold, determine an intra prediction mode corresponding to a first prediction angle as the third intra prediction mode, where the first prediction angle is determined according to the prediction angle of the first intra prediction mode and the prediction angle of the second intra prediction mode, and when the absolute value of the difference between the prediction angle of the first intra prediction mode and the prediction angle of the second intra prediction mode is greater than the second threshold, determine a planar mode or a DC mode as the third intra prediction mode.

In some embodiments, the transform unit 520 is specifically configured to determine a transform matrix set adapted to the GPM as the transform matrix set used for the first transform.

In some embodiments, the first transform is used for processing textures of the current block in an oblique direction, and the second transform is used for processing textures of the current block in a horizontal direction and textures of the current block in a vertical direction.

FIG. 19 is a schematic block diagram of an encoder 600 according to embodiments of the present disclosure.

As illustrated in FIG. 19, the encoder 600 can include a prediction unit 610, a residual unit 620, a transform unit 630, and an encoding unit 640.

The prediction unit 610 is configured to predict a current block based on a first prediction mode and a second prediction mode which correspond to a GPM to obtain a prediction block of the current block. The residual unit 620 is configured to obtain a residual block of the current block based on the prediction block of the current block. The transform unit 630 is configured to perform a third transform on the residual block of the current block to obtain a third transform coefficient of the current block, and perform a fourth transform on the third transform coefficient to obtain a fourth transform coefficient of the current block. The encoding unit 640 is configured to encode the fourth transform coefficient.

In some embodiments, the encoding unit 640 is specifically configured to encode a first flag, a second flag, and the fourth transform coefficient, where the first flag indicates that the GPM is allowed to be used for predicting a block in a current sequence, and the second flag indicates that the fourth transform is allowed to be used for transforming the block in the current sequence.

In some embodiments, the encoding unit 640 is specifically configured to encode the first flag, the second flag, the fourth transform coefficient, and a third flag, where the third flag indicates that both the GPM and the fourth transform are allowed to be used for the block in the current sequence.

In some embodiments, the transform unit 630 is specifically configured to, in a case where a height and/or a width of the current block is greater than or equal to a first threshold, perform the fourth transform on the third transform coefficient to obtain the fourth transform coefficient.

In some embodiments, before performing the fourth transform on the third transform coefficient to obtain the fourth transform coefficient of the current block, the transform unit 630 is further configured to determine a transform matrix set used for the fourth transform.

In some embodiments, the transform matrix set used for the fourth transform is the same as a transform matrix set adapted to a planar mode or a DC mode.

In some embodiments, the transform unit 630 is specifically configured to determine a partition line formed by points where a weight of the first prediction mode and a weight of the second prediction mode are the same, determining an angle index for the partition line, and determine the transform matrix set used for the fourth transform based on the angle index.

In some embodiments, the transform unit 630 is specifically configured to determine a weight derivation mode used for the GPM, and determine a transform matrix set adapted to an intra prediction mode corresponding to the weight derivation mode as the transform matrix set used for the fourth transform.

In some embodiments, the first prediction mode is a first intra prediction mode, and the second prediction mode is a second intra prediction mode. The transform unit 630 is specifically configured to determine a third intra prediction mode based on the first intra prediction mode and the second intra prediction mode, where the transform matrix set used for the fourth transform is the same as a transform matrix set adapted to the third intra prediction mode.

In some embodiments, the transform unit 630 is specifically configured to determine a default prediction mode among the first intra prediction mode and the second intra prediction mode as the third intra prediction mode, or determine an intra prediction mode corresponding to a weight derivation mode used for the GPM among the first intra prediction mode and the second intra prediction mode as the third intra prediction mode, or determine the third intra prediction mode based on a weight of the first intra prediction mode and/or a weight of the second intra prediction mode, or determine the third intra prediction mode based on a type of the first intra prediction mode and a type of the second intra prediction mode, or determine the third intra prediction mode based on a prediction angle of the first intra prediction mode and a prediction angle of the second intra prediction mode.

In some embodiments, the transform unit 630 is specifically configured to determine the third intra prediction mode based on a weight of the first intra prediction mode at a default position or a weight of the second intra prediction mode at the default position.

In some embodiments, the transform unit 630 is specifically configured to determine an intra prediction mode with a maximum weight at the default position among the first intra prediction mode and the second intra prediction mode as the third intra prediction mode. In some embodiments, the default position is a center position.

In some embodiments, the transform unit 630 is specifically configured to, when the first intra prediction mode and the second intra prediction mode include an angular prediction mode and a non-angular prediction mode, determine the angular prediction mode as the third intra prediction mode.

In some embodiments, the third intra prediction mode is determined based on the prediction angle of the first intra prediction mode and the prediction angle of the second intra prediction mode as follows. When an absolute value of a difference between the prediction angle of the first intra prediction mode and the prediction angle of the second intra prediction mode is less than or equal to a second threshold, an intra prediction mode corresponding to a first prediction angle is determined as the third intra prediction mode, where the first prediction angle is determined according to the prediction angle of the first intra prediction mode and the prediction angle of the second intra prediction mode. When the absolute value of the difference between the prediction angle of the first intra prediction mode and the prediction angle of the second intra prediction mode is greater than the second threshold, a planar mode or a DC mode is determined as the third intra prediction mode.

In some embodiments, the transform unit 630 is specifically configured to determine a transform matrix set adapted to the GPM as the transform matrix set used for the fourth transform.

In some embodiments, the fourth transform is used for processing textures of the current block in an oblique direction, and the third transform is used for processing textures of the current block in a horizontal direction and textures of the current block in a vertical direction.

It can be understood that the apparatus embodiments and the method embodiments can correspond to each other, and similar descriptions can refer to the method embodiments. To avoid repetition, details are not repeated herein. Specifically, the decoder 500 illustrated in FIG. 18 can execute the method 300 in embodiments of the present disclosure, and the aforementioned and other operations and/or functions of each unit in the decoder 500 are configured to implement related operations of various methods such as the method 300. Similarly, the encoder 600 illustrated in FIG. 19 can execute the method 400 in embodiments of the present disclosure, and the aforementioned and other operations and/or functions of each unit in the encoder 600 are configured to implement related operations of various methods such as the method 400.

It is further to be understood that units of the decoder 500 or the encoder 600 involved in the embodiments of the present disclosure can be separately or wholly combined into one or several other units, or one (or more) of the units herein can further be partitioned into multiple units of smaller functions. In this way, same operations can be implemented, and implementation of the technical effects of the embodiments of the present disclosure is not affected. The foregoing units are partitioned based on logical functions. In an actual implementation, a function of one unit can also be implemented by multiple units, or functions of multiple units are implemented by one unit. In other embodiments of the present disclosure, the decoder 500 or the encoder 600 can also include other units. During the actual implementation, the functions can also be cooperatively implemented by other units and can be cooperatively implemented by multiple units. According to another embodiment of the present disclosure, computer programs (including program codes) that can perform the operations involved in the corresponding method can be run on a general computing device such as a general computer, which includes processing elements and storage elements such as a central processing unit (CPU), a random access memory (RAM), and a read-only memory (ROM), to construct the decoder 500 or the encoder 600 involved in the embodiments of the present disclosure and implement the encoding method and the decoding method provided in the embodiments of the present disclosure. The computer programs can be recorded in, for example, a computer-readable storage medium, and can be loaded into any electronic device having a processing capability through the computer-readable storage medium, and run in the electronic device, to implement the corresponding method in the embodiments of the present disclosure.

In other words, the units mentioned above can be implemented in the form of hardware, can be implemented by instructions in the form of software, or can be implemented in the form of a combination of software and hardware. Specifically, the operations of the method embodiments in the embodiments of the present disclosure can be completed by a hardware integrated logical circuit in a processor, and/or by using instructions in a form of software. The operations of the methods disclosed with reference to the embodiments of the present disclosure can be directly performed and completed by using a hardware decoding processor, or can be performed and completed by using a combination of hardware and software in the decoding processor. Optionally, the software can be located in a mature storage medium in the field, such as a random access memory, a flash memory, a read-only memory, a programmable read-only memory, an electrically-erasable programmable memory, or a register. The storage medium is located in the memory. The processor reads information in the memory and completes the operations of the foregoing method embodiments in combination with hardware thereof.

Figure 20:
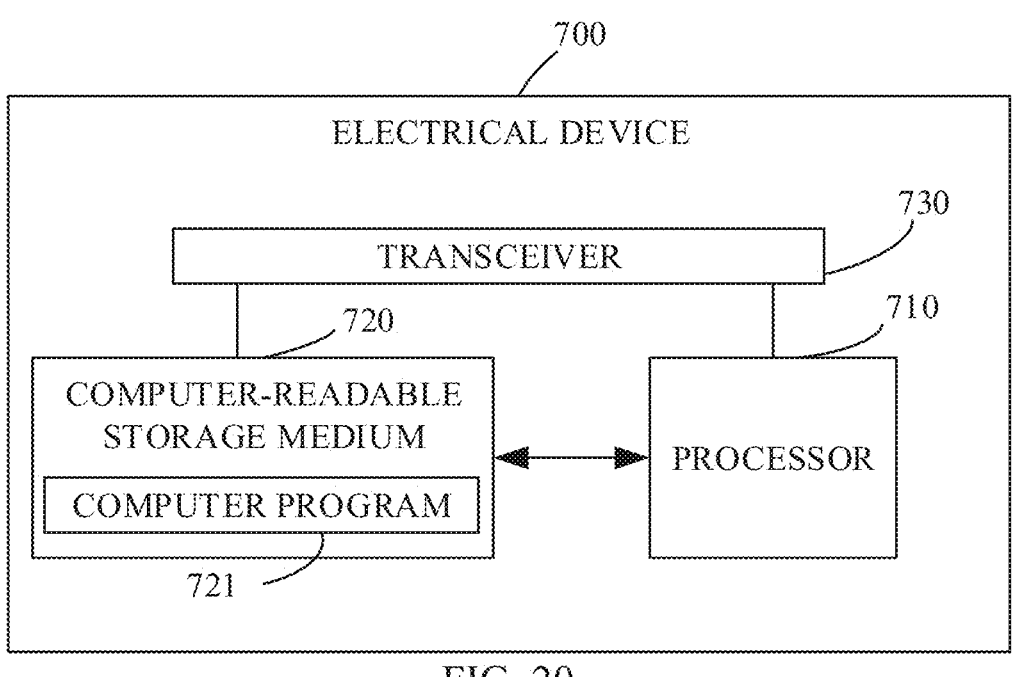
FIG. 20 is a schematic structural diagram of an electronic device provided in embodiments of the present disclosure.

FIG. 20 is a schematic structural diagram of an electronic device 700 provided in embodiments of the present disclosure.

As illustrated in FIG. 20, the electronic device 700 at least includes a processor 710 and a computer-readable storage medium 720. The processor 710 and the computer-readable storage medium 720 can be connected to each other through a bus or in another manner. The computer-readable storage medium 720 is configured to store computer programs 721 and the computer programs 721 include computer instructions, and the processor 710 is configured to execute the computer instructions stored in the computer-readable storage medium 720. The processor 710 is the computing core and control core of the electronic device 700. The processor 710 is adapted to implementing one or more computer instructions, and are adapted to loading and executing the one or more compute instructions to implement a corresponding method procedure or a corresponding function.

As an example, the processor 710 can also be called a CPU. The processor 710 includes but is not limited to: a general processor, a digital signal processor (DSP), an application-specific integrated circuit (ASIC), a field programmable gate array (FPGA), or another programmable logic device, a discrete gate, a transistor logic device, or a discrete hardware component.

As an example, the computer-readable storage medium 720 can be a high-speed RAM memory, or can be a non-volatile memory, such as at least one magnetic disk memory. Optionally, the computer-readable storage medium 720 can be at least one computer-readable storage medium far away from the processor 710. Specifically, the computer-readable storage medium 720 includes, but is not limited to, a volatile memory and/or a non-volatile memory. The non-volatile memory can be an ROM, a programmable read-only memory (PROM), an erasable programmable read-only memory (EPROM), an electrically erasable programmable read-only memory (EEPROM), or a flash memory. The volatile memory can be an RAM, used as an external cache. Through exemplary but not limitative description, many forms of RAMs can be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synch link DRAM, SLDRAM), and a direct Rambus dynamic random access memory (direct Rambus RAM, DR RAM).

In an implementation, the electronic device 700 can be the encoder or the encoding framework involved in embodiments of the present disclosure. The computer-readable storage medium 720 stores a first computer instruction. The first computer instruction stored in the computer-readable storage medium 720 is loaded and executed by the processor 710, to implement corresponding steps in the encoding method provided in embodiments of the present disclosure. In other words, the first computer instruction in the computer-readable storage medium 720 is loaded and executed by the processor 710 to perform corresponding steps. To avoid repetition, details are not described herein again.

In an implementation, the electronic device 700 can be the decoder or the decoding framework involved in embodiments of the present disclosure. The computer-readable storage medium 720 stores a second computer instruction. The second computer instruction stored in the computer-readable storage medium 720 is loaded and executed by the processor 710, to implement corresponding steps in the decoding method provided in embodiments of the present disclosure. In other words, the second computer instruction in the computer-readable storage medium 720 is loaded and executed by the processor 710 to perform corresponding steps. To avoid repetition, details are not described herein again.

According to another aspect of the present disclosure, embodiments of the present disclosure further provide a coding system. The coding system includes the decoder and the encoder.

According to another aspect of the present disclosure, embodiments of the present disclosure further provide a computer-readable storage medium (e.g., memory). The computer-readable storage medium is a memory device in the electronic device 700, and is configured to store programs and data. For example, the computer-readable storage medium is the computer-readable storage medium 720. It can be understood that the computer-readable storage medium 720 herein can include an internal storage medium in the electronic device 700, and can also include an extended storage medium supported by the electronic device 700. The computer-readable storage medium provides a storage space, and the storage space stores an operating system of the electronic device 700. In addition, the storage space further stores one or more computer instructions adapted to being loaded and executed by the processor 710, and the one or more computer instructions can be the one or more computer programs 721 (including program codes).

According to another aspect of the present disclosure, a computer program product or a computer program is provided. The computer program product or the computer program includes computer instructions, and the computer instructions are stored in a computer-readable storage medium. For example, the computer instructions are the computer program 721. In this case, the electronic device 700 can be a computer, the processor 710 reads the computer instructions from the computer-readable storage medium 720, and executes the computer instructions, to cause the computer to perform the encoding method or decoding method provided in the various implementations.

In other words, when software is used to implement the implementations, the implementations can be implemented completely or partially in a form of a computer program product. The computer program product includes one or more computer instructions. When the compute instructions are loaded and executed on the computer, the procedure of the embodiments of the present disclosure is completely or partially run or functions of the embodiments of the present disclosure are completely or partially implemented. The computer can be a general-purpose computer, a special-purpose computer, a computer network, or another programmable apparatus. The computer instructions can be stored in a computer-readable storage medium or transmitted from one computer-readable storage medium to another computer-readable storage medium. For example, the computer instructions can be transmitted from one website, computer, server, or data center to another website, computer, server, or data center in a wired (for example, a coaxial cable, an optical fiber or a digital subscriber line (DSL)) or wireless (for example, infrared, wireless or microwave) manner.

A person of ordinary skill in the art can be aware that, the units and process steps of the examples described with reference to the implementations disclosed in the present disclosure can be implemented in electronic hardware, or a combination of computer software and electronic hardware. Whether the functions are executed by hardware or software depends on particular applications and design constraint conditions of the technical solutions. A person skilled in the art can use different methods to implement the described functions for each particular application, but it cannot be considered that the implementation goes beyond the scope of the present disclosure.

Finally, the contents are merely embodiments of the present disclosure, but are not intended to limit the protection scope of the present disclosure. Any variation or substitution readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A decoding method, comprising:

decoding a bitstream to obtain a first transform coefficient of a current block;

determining a weight derivation mode used for a geometric partitioning mode (GPM);

determining a transform matrix set adapted to an intra prediction mode corresponding to the weight derivation mode as a transform matrix set used for a first transform;

performing the first transform on the first transform coefficient to obtain a second transform coefficient of the current block;

performing a second transform on the second transform coefficient to obtain a residual block of the current block;

predicting the current block based on a first prediction mode and a second prediction mode which correspond to the GPM to obtain a prediction block of the current block; and obtaining a reconstructed block of the current block based on the prediction block of the current block and the residual block of the current block.

2. The method of claim 1, wherein performing the first transform on the first transform coefficient to obtain the second transform coefficient of the current block comprises:

decoding the bitstream to obtain a first flag and a second flag; and when the first flag indicates that the GPM is allowed to be used for predicting a block in a current sequence and the second flag indicates that the first transform is allowed to be used for transforming the block in the current sequence, performing the first transform on the first transform coefficient to obtain the second transform coefficient.

3. The method of claim 2, wherein performing the first transform on the first transform coefficient to obtain the second transform coefficient of the current block comprises:

when the first flag indicates that the GPM is allowed to be used for predicting the block in the current sequence and the second flag indicates that the first transform is allowed to be used for transforming the block in the current sequence, in a case where a height and/or a width of the current block is greater than or equal to a first threshold, performing the first transform on the first transform coefficient to obtain the second transform coefficient.

4. An encoding method, comprising:

predicting a current block based on a first prediction mode and a second prediction mode which correspond to a geometric partitioning mode (GPM) to obtain a prediction block of the current block;

obtaining a residual block of the current block based on the prediction block of the current block;

performing a third transform on the residual block of the current block to obtain a third transform coefficient of the current block;

determining a weight derivation mode used for the GPM;

determining a transform matrix set adapted to an intra prediction mode corresponding to the weight derivation mode as a transform matrix set used for a fourth transform;

performing the fourth transform on the third transform coefficient to obtain a fourth transform coefficient of the current block; and encoding the fourth transform coefficient.

5. The method of claim 4, wherein encoding the fourth transform coefficient comprises:

encoding a first flag, a second flag, and the fourth transform coefficient;

wherein the first flag indicates that the GPM is allowed to be used for predicting a block in a current sequence, and the second flag indicates that the fourth transform is allowed to be used for transforming the block in the current sequence.

6. The method of claim 5, wherein performing the fourth transform on the third transform coefficient to obtain the fourth transform coefficient of the current block comprises:

in a case where a height and/or a width of the current block is greater than or equal to a first threshold, performing the fourth transform on the third transform coefficient to obtain the fourth transform coefficient.

7. A decoder, comprising:

a processor; and a non-transitory computer-readable storage medium storing a computer program which, when executed by the processor, causes the processor to:

decode a bitstream to obtain a first transform coefficient of a current block;

determine a weight derivation mode used for a geometric partitioning mode (GPM);

determine a transform matrix set adapted to an intra prediction mode corresponding to the weight derivation mode as a transform matrix set used for a first transform;

perform the first transform on the first transform coefficient to obtain a second transform coefficient of the current block;

perform a second transform on the second transform coefficient to obtain a residual block of the current block;

predict the current block based on a first prediction mode and a second prediction mode which correspond to the GPM to obtain a prediction block of the current block; and obtain a reconstructed block of the current block based on the prediction block of the current block and the residual block of the current block.

8. The decoder of claim 7, wherein performing the first transform on the first transform coefficient to obtain the second transform coefficient of the current block comprises:

decoding the bitstream to obtain a first flag and a second flag; and when the first flag indicates that the GPM is allowed to be used for predicting a block in a current sequence and the second flag indicates that the first transform is allowed to be used for transforming the block in the current sequence, performing the first transform on the first transform coefficient to obtain the second transform coefficient.

9. The decoder of claim 8, wherein performing the first transform on the first transform coefficient to obtain the second transform coefficient of the current block comprises:

when the first flag indicates that the GPM is allowed to be used for predicting the block in the current sequence and the second flag indicates that the first transform is allowed to be used for transforming the block in the current sequence, in a case where a height and/or a width of the current block is greater than or equal to a first threshold, perform the first transform on the first transform coefficient to obtain the second transform coefficient.

10. An encoder, comprising:

a processor; and a non-transitory computer-readable storage medium storing a computer program which, when executed by the processor, causes the processor to:

predict a current block based on a first prediction mode and a second prediction mode which correspond to a geometric partitioning mode (GPM) to obtain a prediction block of the current block;

obtain a residual block of the current block based on the prediction block of the current block;

perform a third transform on the residual block of the current block to obtain a third transform coefficient of the current block;

determine a weight derivation mode used for the GPM;

determine a transform matrix set adapted to an intra prediction mode corresponding to the weight derivation mode as a transform matrix set used for a fourth transform;

perform the fourth transform on the third transform coefficient to obtain a fourth transform coefficient of the current block; and encode the fourth transform coefficient.

11. The encoder of claim 10, wherein encoding the fourth transform coefficient comprises:

encode a first flag, a second flag, and the fourth transform coefficient;

wherein the first flag indicates that the GPM is allowed to be used for predicting a block in a current sequence, and the second flag indicates that the fourth transform is allowed to be used for transforming the block in the current sequence.

12. The encoder of claim 11, wherein performing the fourth transform on the third transform coefficient to obtain the fourth transform coefficient of the current block comprises:

in a case where a height and/or a width of the current block is greater than or equal to a first threshold, perform the fourth transform on the third transform coefficient to obtain the fourth transform coefficient.

\* \* \* \* \*